(12) United States Patent
Westgarth et al.

(10) Patent No.: US 12,084,925 B2
(45) Date of Patent: Sep. 10, 2024

(54) CLAMP ASSEMBLY

(71) Applicant: NATIONAL OILWELL VARCO UK LIMITED, Manchester (GB)

(72) Inventors: Richard Matthew Westgarth, Durham (GB); Thomas William Scott Patrick, Newcastle Upon Tyne (GB); Jonathan Tweddle, Durham (GB)

(73) Assignee: NATIONAL OILWELL VARCO UK LIMITED, Gloucestershire (GB)

( * ) Notice: Subject to any disclaimer, the term of this patent is extended or adjusted under 35 U.S.C. 154(b) by 450 days.

(21) Appl. No.: 17/247,228

(22) Filed: Dec. 4, 2020

(65) Prior Publication Data

US 2021/0172268 A1 Jun. 10, 2021

(30) Foreign Application Priority Data

Dec. 5, 2019 (GB) ..................................... 1917817

(51) Int. Cl.
*E21B 19/16* (2006.01)
*E21B 19/10* (2006.01)
(Continued)

(52) U.S. Cl.
CPC .............. *E21B 19/10* (2013.01); *E21B 19/16* (2013.01); *F16L 1/09* (2013.01); *F16L 1/20* (2013.01); *F16L 1/26* (2013.01); *F16L 21/06* (2013.01)

(58) Field of Classification Search
CPC ....... F16L 1/09; F16L 1/10; F16L 1/20; F16L 1/26; F16L 21/06; F16L 21/065; E21B 19/10; E21B 19/16; B29C 65/7802
See application file for complete search history.

(56) References Cited

U.S. PATENT DOCUMENTS 3,426,417 A * 2/1969 Austin ...................... F16L 1/09
29/237
5,692,285 A * 12/1997 Weimer .............. B29C 66/1142
29/401.1
(Continued)

FOREIGN PATENT DOCUMENTS

DE 102006026334 A1 12/2007
EP 0852996 A2 7/1998
(Continued)

OTHER PUBLICATIONS

"United Kingdom Application Serial No. GB2018988.2, Search Report mailed May 25, 2021", 1 pg.
(Continued)

*Primary Examiner* — Benjamin F Fiorello
*Assistant Examiner* — Stacy N Lawson
(74) *Attorney, Agent, or Firm* — Schwegman Lundberg & Woessner, P.A.

(57) ABSTRACT

A clamp assembly is disclosed for breaking a severable connection in a pressurised flowline of an oil or gas well. First and second clamp members have first and second interconnected and clamp segments which are pivotally moveable to close around a conduit. First and second guide rods with parallel axes connect the respective first and second clamp segments of the first and second clamp members. A drive mechanism drives axial movement of the first and second clamp members relative to each other. The first and second clamp members engage first and second conduits on opposite sides of the severable connection. Each clamp segment has an inner surface comprising a recess adapted to receive a load shoulder on the conduits.

19 Claims, 11 Drawing Sheets

(51) Int. Cl.
  *F16L 1/09*    (2006.01)
  *F16L 1/20*    (2006.01)
  *F16L 1/26*    (2006.01)
  *F16L 21/06*   (2006.01)

(56) References Cited

U.S. PATENT DOCUMENTS

| | | | |
|---|---|---|---|
| 5,770,006 A * | 6/1998 | Andrew | B29C 66/52231 |
| | | | 156/499 |
| 2002/0101017 A1 * | 8/2002 | Kolarik | B25B 27/10 |
| | | | 269/43 |
| 2012/0247598 A1 * | 10/2012 | Bremner | B23P 19/068 |
| | | | 29/800 |
| 2015/0165672 A1 * | 6/2015 | Montgomery | B23P 19/04 |
| | | | 156/391 |

FOREIGN PATENT DOCUMENTS

| | | | | |
|---|---|---|---|---|
| EP | 2044356 A1 | | 4/2009 | |
| EP | 2044356 B1 | | 3/2012 | |
| FR | 3055683 A1 | * | 3/2018 | ............ B25B 27/16 |
| KR | 784255 B1 | * | 12/2007 | |
| KR | 2357538 B1 | * | 2/2022 | |

OTHER PUBLICATIONS

"United Kingdom Application Serial No. 1917817.7, Search Report mailed Jul. 23, 2020", 1 pg.

* cited by examiner

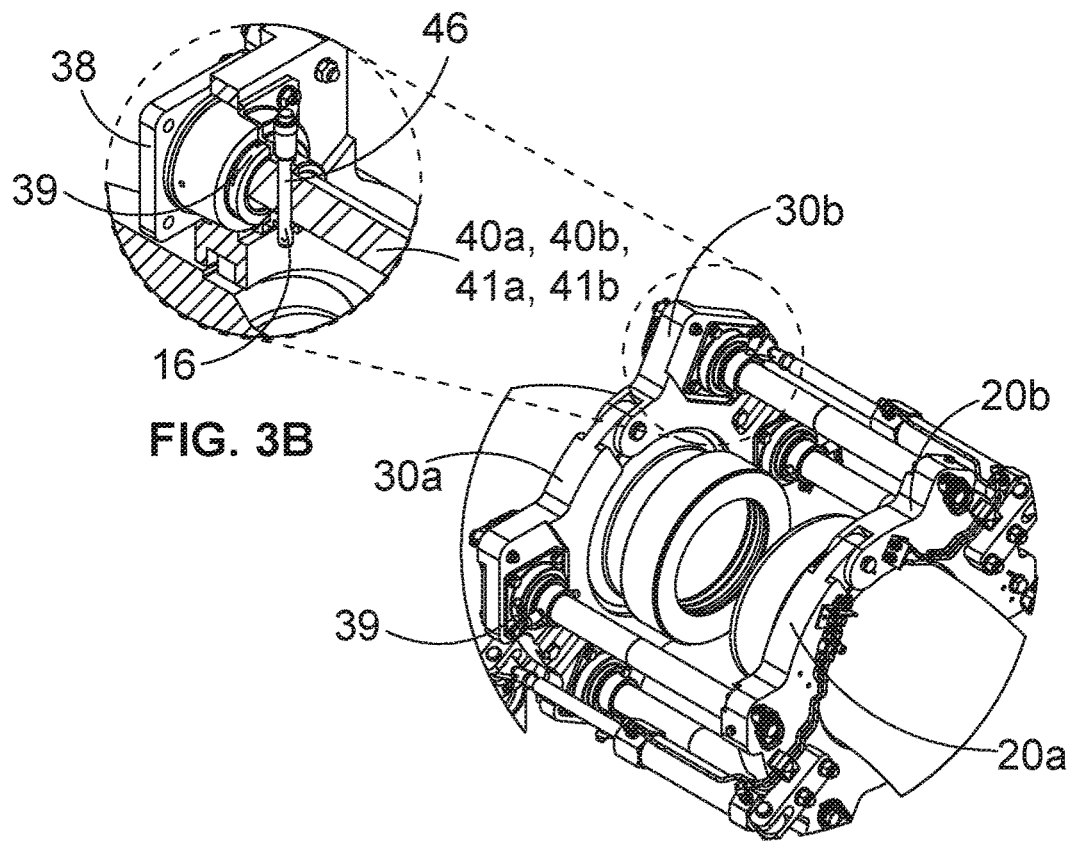
FIG. 3B
FIG. 3A
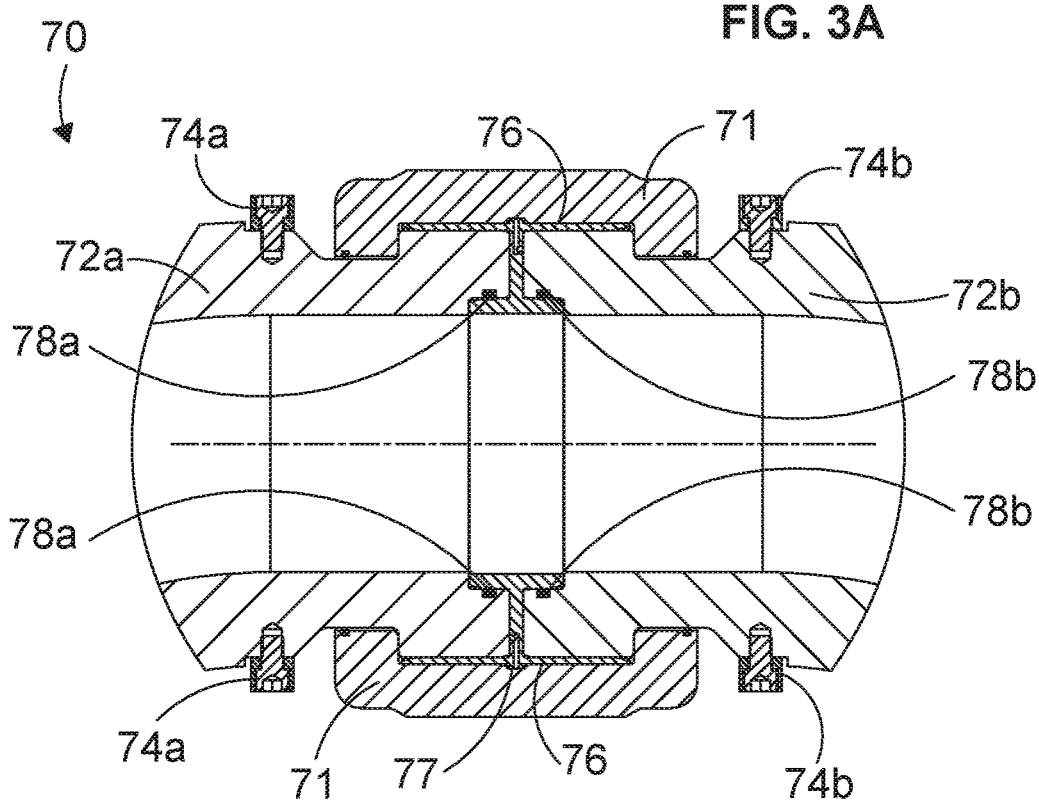
FIG. 4

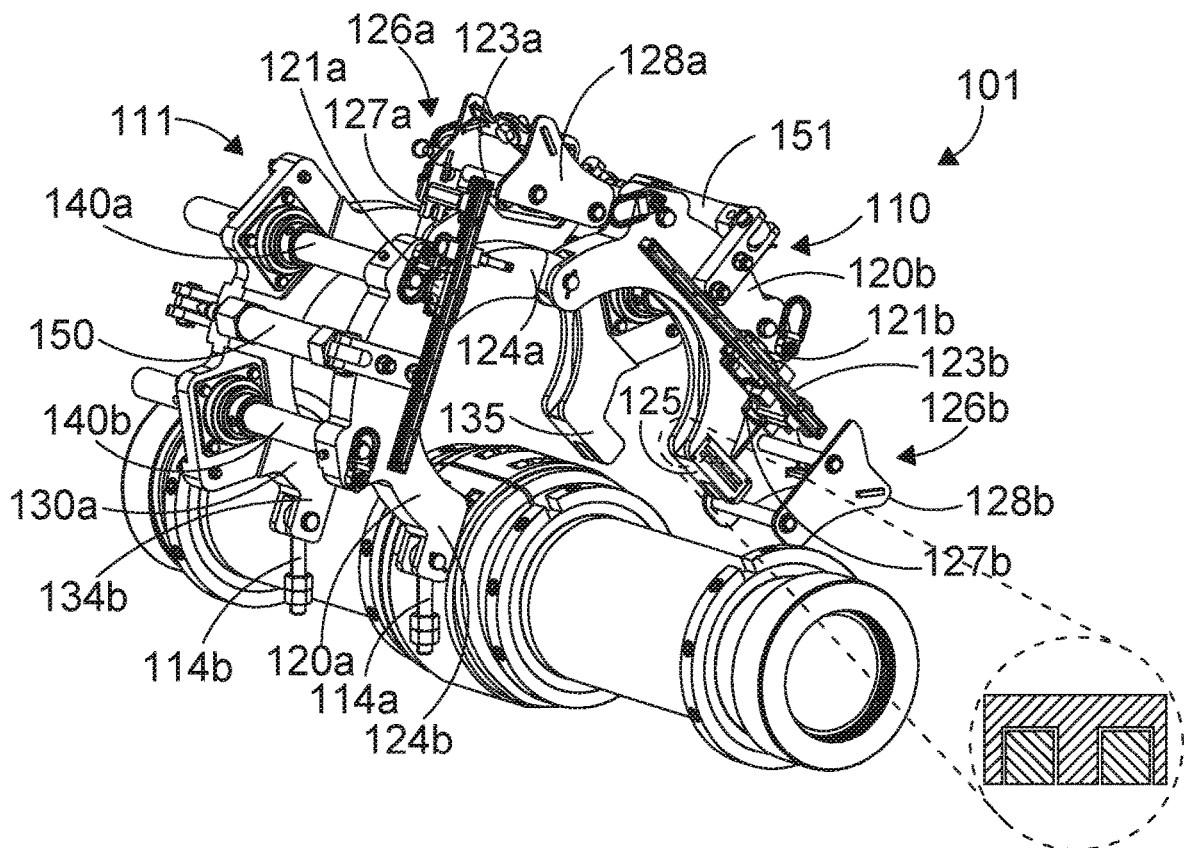
FIG. 7A
FIG. 7M
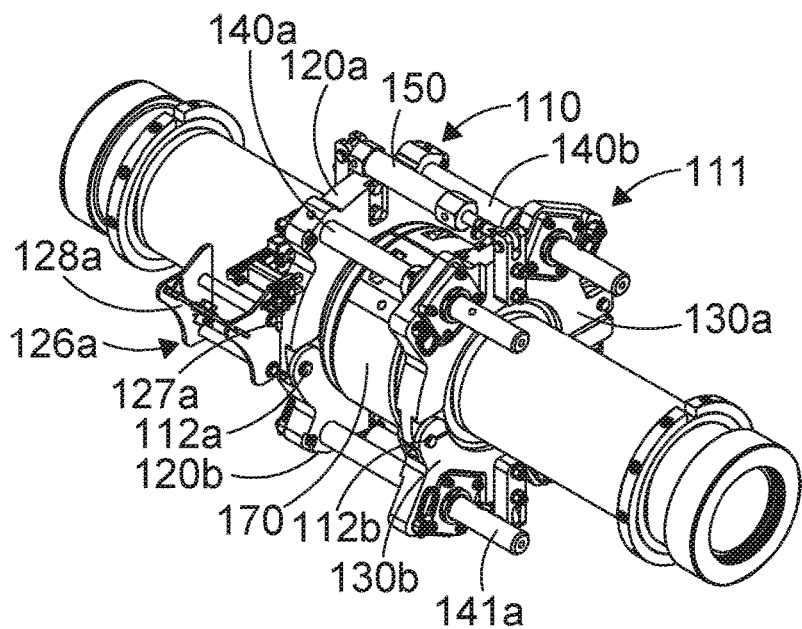
FIG. 7B

CLAMP ASSEMBLY

CROSS-REFERENCE TO RELATED APPLICATIONS

This patent application claims the benefit of priority to GB Patent Application No. 1917817.7, filed on 5 Dec. 2019, which application is incorporated herein by reference in its entirety.

TECHNOLOGICAL FIELD

The present application relates to a clamp assembly, typically for handling two conduits connected together and particularly for making and/or optionally breaking connections between the conduits and optionally for servicing components of the conduits at the connection, for example seals, bearings or other components accessible at the connection. In some examples, conduits are flowline conduits on opposite sides of a connection flowing fluids to or from an oil or gas well.

BACKGROUND

EP0852996 discloses apparatus for fusing plastic pipes. DE102006026334 discloses a device for joining subsea pipelines.

SUMMARY

According to one or more embodiments there is provided a clamp assembly adapted for breaking a connection in a pressurised flowline of an oil or gas well. The clamp assembly may include:
  first and second clamp members, each of the first and second clamp members having at least first and second interconnected clamp segments, the first clamp segment being pivotally moveable with respect to the second clamp segment to close the clamp segments around a conduit;
  at least one first guide rod with a first axis connecting a first clamp segment of the first clamp member to a first clamp segment of the second clamp member, and at least one second guide rod with a second axis connecting a second clamp segment of the first clamp member to a second clamp segment of the second clamp member, wherein the first and second axes of the first and second guide rods are parallel;
  a drive mechanism connecting the first clamp member to the second clamp member, wherein the drive mechanism is adapted to drive axial movement of the first and second clamp members relative to each other in a direction parallel to the first and second axes;
  wherein the first and second clamp members are adapted to engage with the conduit when the clamp segments are closed around the conduit, and wherein the first and second guide rods are adapted to permit relative axial movement of the first and second clamp members in a direction parallel to the first and second axes while maintaining alignment of the first and second clamp members.

Optionally the clamp assembly is adapted to handle (for example to separate and optionally make up) connections in large bore conduits, for example connections of pressurised flowlines used to flow high-pressure fluid to and optionally from the bores of oil and gas wells, for example during hydraulic fracturing operations. Optionally the diameter of the bore of the conduit is larger than 4 inches, optionally larger than 5 inches (0.127 metres), optionally from 5 inches to 8 inches (0.203 metres), or optionally approximately 7⅝ths inches (0.194 metres). Optionally the diameter of the bore of the conduit is less than 15 inches (0.381 metres), optionally less than 10 inches (0.254 metres), optionally less than or equal to 8 inches (0.203 metres). Optionally the connection is between two sections of the conduit. Optionally the two sections of the conduit are relatively moveable when the connection is made up, for example, some connections handled by the clamp assembly could permit pivotal movement of the conduit sections, e.g. rotation of one section in relation to the other, e.g. around the axis of at least one of the sections when the connection is made up and operational. In the case of conduits which permit relative movement of adjacent conduit sections on either side of a connection, such as articulating flowlines, the connections often comprise one or more components which can require routine maintenance or replacement, such as bearing rings and seals e.g. annular seals.

Optionally the conduits are flowline conduits adapted for use in oil and gas wells for flowing fluids into or out of the well.

Optionally the clamp assembly allows in-field separation and makeup (e.g. at the site of the wellbore) of conduit connections. Optionally the clamp assembly provides access to the internal components of a conduit or conduit connection for cleaning, maintenance or replacement. This allows for a significant reduction in the duration of interruption of wellbore operations, such as hydraulic fracturing operations, required for maintenance and replacement of connection components, and also typically reduces the difficulty of such operations. The pivotally interconnected clamp segments of the first and second clamp members also advantageously allow rapid deployment and installation of the clamp assembly, compared to other tools which may comprise two or more separate components which must be assembled each time in the course of deployment and installation.

Since the clamp assembly comprises a first clamp member having at least first and second interconnected clamp segments, each of which are connected or attached to corresponding clamp segments of a second clamp member, the entire clamp assembly can optionally be lifted or suspended from a single lifting point e.g. a lifting eye or ring. Furthermore, the entire clamp assembly can optionally be lifted or manoeuvred by a single lifting device (which might be for example a crane or a forklift, optionally having a capacity of at least 100 to 500 kg). Optionally the clamp assembly (and optionally the one or more lifting points of the clamp assembly) are capable of at least partially supporting the weight of the conduits adjacent the conduit connection, as well as the clamp assembly itself, which can advantageously reduce the requirements for ancillary support structures to support the conduits while the clamp assembly is used to separate the conduit connection.

Optionally first and second clamp segments of the first clamp member are constrained to pivot synchronously with each other, and similarly, the first and second clamp segments of the second clamp member are constrained to pivot synchronously with each other. Optionally this constraint is facilitated by the first and second guide rods. For example, a guide rod could have a sliding section held in an orientation bore which permits sliding of at least one section of the guide rod through the orientation bore while resisting misalignment of the section of the guide rod with the orientation bore, for example, by providing a close tolerance between the orientation bore and the guide rod. Thus pivotal movement of a clamp segment on one clamp member urges corresponding pivotal movement of the corresponding clamp segment on the other clamp member, at the same rate. Optionally the first and second guide rods could be telescopic in other examples.

Optionally the first and second clamp segments of each of the first and second clamp members are constrained to move axially synchronously with each other.

Optionally the first and second clamp members have a first (optionally axial) degree of freedom of movement, and optionally the at least first and second clamp segments (optionally corresponding first and second clamp segments of the first and second clamp members) have a second (optionally rotational) degree of freedom of movement, which can optionally be perpendicular to the first degree of freedom of movement. Optionally the at least first and second clamp segments are pivotally moveable in a plane that is perpendicular to the axis of movement of the first and second clamp members. Optionally the first and second clamp segments pivot around a pivot connection that is parallel to the first and second axes. The first and second axes of the at least one first and second guide rods are optionally parallel with the axis of movement of the drive mechanism. The first and second axes of the at least one first and second guide rods are also optionally parallel with an axis of the first degree of freedom of movement of the first and second clamp members, which is optionally parallel to an axis of the conduit when the first and second clamp segments are closed around the conduit. Optionally the first and second axes are spaced apart from one another.

Optionally the various ranges of freedom of movement of the various parts are constrained. For example, while the first and second clamp members are movable in the first and second degrees of freedom, they are also optionally constrained to move only within those degrees of freedom, e.g. only axially apart, and only rotationally around the pivot connection between the clamp segments, and the assembly is optionally arranged such that movement along other axes, or around other axes, is resisted or restricted or even substantially prevented. This helps the assembly to maintain alignment of the two conduits on opposite sides of the connection during breaking, so that the two conduits separate only by axial movement, while retaining the alignment of their axes, and the parallel orientation of the clamp members attached to the conduit, thus facilitating makeup of the conduits after servicing is complete. This helps to reduce non-axial movement, e.g. sway, yaw and pitch of the conduit sections relative to one another when the sections are separated, and thereby assist with fast and accurate re-assembly after completion of maintenance operations on the connection.

Optionally the clamp segments forming the first and second clamp members are formed from a metallic material, optionally aluminium, optionally high-strength aluminium. Optionally each clamp segment is formed e.g. cut, machined or milled from a single integral piece e.g. a single plate or block of material.

Optionally a recess is formed in an inner surface of each clamp segment, optionally by cutting or milling, which is optionally at least partially annular.

Optionally redundant or excess portions of each clamp segment can be removed, optionally by machining or milling, during or optionally after production of the clamp segment, optionally to reduce the weight of the clamp assembly.

Optionally each clamp segment of the first and second clamp members comprises at least two, optionally parallel plates which are spaced apart from each other, optionally in an axial direction. Optionally the inner surface of each clamp segment is at least partially arcuate, optionally concave, and optionally at least partially semi-circular. Optionally the inner surfaces of the at least two plates are aligned with each other in an axial direction.

Optionally at least a part of the inner surface of each clamp segment comprises an annular portion. Optionally each annular portion on each segment has the same radius. Optionally when the clamp segments are closed, the annular portion(s) on each segment engage arcuate parts of the outer surface of the flowline. Optionally the radius of the annular portions of the clamp segments matches the radius of the arcuate parts of the outer surface of the flowline. Optionally when the clamp segments are closed, the annular portions of the inner surfaces lie on a circle. Optionally the circle has a centre that is coincident with the axis of axial movement of the first and second clamp members.

Optionally a recess is formed in each of the first and second clamp members. Optionally the recess can be disposed between the plates of the clamp segment. Optionally the recess is at least partially annular. Optionally the recess in one clamp member is parallel to the recess in the other clamp member. Optionally the recesses are perpendicular to the axis of at least one or more of the first and second guide rods, conduit and drive mechanisms.

Optionally a recess is disposed on the inner surface of each clamp member, e.g. on an inner surface of at least one clamp segment, optionally on an inner surface of each clamp segment. Optionally each recess is adapted to engage with at least one protrusion (e.g. a lip or a shoulder) on an outer surface of the conduit connection. Optionally the protrusion is at least partially annular and can optionally extend circumferentially around the conduit sections, for at least a part of the distance around the outer surface of the conduit sections. Optionally the axial dimension of the recess of each clamp segment corresponds to an axial dimension of its associated protrusion. Optionally each recess is adapted to receive at least one protrusion. Optionally the recesses of the first and second clamp members engage with the protrusions on the conduit sections either side of the conduit connection to break the connection, optionally by axially separating the conduit sections. Optionally the clamp members remain engaged with the conduit sections to re-make the conduit connection, optionally by axially closing the conduit sections.

Optionally the outer surface of each clamp segment is generally arcuate, and optionally convex. Optionally the recess formed between the inner surfaces of the plates is a closed recess.

Optionally each clamp segment has a generally U- or C-shaped profile. Optionally one or more support points for at least one guide rod, and optionally for at least one drive mechanism, are disposed on the outer surface of each clamp segment.

Optionally each clamp member, and optionally each clamp segment, has at least one lifting point, e.g. a padeye.

Optionally the at least first and second clamp segments of each clamp member are interconnected by a pivot connection such as a hinge. Optionally the pivot connection is disposed at a distal end of each of the at least first and second clamp segments. Optionally the pivot connection allows the at least first and second clamp segments to pivot e.g. rotate relative to each other in each clamp member. Optionally the pivotal movement is constrained within a limited range. For example, optionally the at least first and second clamp segments can rotate between 60 degrees and 120 degrees relative to each other, and optionally between 60 degrees and 100 degrees relative to each other.

Optionally the first and second clamp members each have an open configuration in which the ends of the clamp segments distal to the pivot connection are spaced apart, and a closed configuration in which the said ends of the clamp segments are closer together than in the open configuration. Optionally a first clamp segment (optionally each first clamp segment of the first and second members) comprises a latching device adapted to latch (e.g. releasably latch) the first clamp segment to another clamp segment (e.g. the second clamp segment) of the same clamp member, optionally when the clamp segments of the clamp member are closed around the conduit (i.e. in the closed configuration). Optionally the one or more latching devices are disposed at an opposing distal end of the first clamp segments from the pivot connection. Optionally the latching devices have an unlocked (e.g. open) position, in which relative pivotal movement of the first and second clamp segments is permitted, and optionally the latching devices have a locked (e.g. closed) position, in which relative pivotal movement of the first and second clamp segments is restricted. Optionally the latching devices are tethered e.g. permanently connected to the first clamp segments in each of the unlocked and the locked positions, and optionally the latching devices cannot be separated from the first clamp segments in either of the unlocked and the locked positions. Optionally the latching devices comprise swing bolts tethered to one of the clamp segments (e.g. the first clamp segment) by a pivot connection which permits the swing bolt to move between the unlocked and locked positions around the pivot connection without detaching from the first clamp segment.

Optionally the first guide rod is fixed to the first clamp segment at only one end, and at the other end, the first guide rod has a sliding connection to the other first clamp segment. Optionally the second guide rod is fixed to the second clamp segment at only one end, and at the other end, the second guide rod has a sliding connection to the other second clamp segment.

Optionally at least two first guide rods are connected between the first clamp segments of the first and second clamp members, and optionally at least two second guide rods are connected between the second clamp segments of the first and second clamp members.

Optionally the first and second guide rods maintain alignment of the first and second clamp members as they move axially relative to each other, which optionally facilitates smooth relative movement of the first and second clamp members, and optionally reduces friction due to misalignment of the first and second clamp members. Optionally the axial length of at least one of the first and second guide rods is constant. Optionally each of the first and second guide rods is fixed to one of the clamp members and optionally has an axially movable connection (e.g. a sliding connection) with the other of the clamp members. Optionally the axially movable connection is provided by a bearing aperture in the said other of the clamp members through which the guide rod passes. Optionally at least one guide rod comprises a bearing rod. Optionally the at least one aperture comprises a bearing device such as a ball bearing, optionally a linear ball bearing, optionally a linear roller bearing.

Optionally the aperture receiving the guide rod maintains alignment of the guide rod during axial movement, e.g. by the bearing device. Optionally the bearing device permits axial movement of the second clamp member relative to the guide rod, and optionally restricts (optionally substantially prevents) non-axial movement (e.g. pitch and/or yaw) of the second clamp member relative to the guide rod. Optionally the bearing device supports the guide rod in a perpendicular orientation relative to the second clamp member. Optionally the rate of axial movement of the said other of the clamp members relative to each guide rod is equal.

Optionally at least one guide rod comprises an indicator, which optionally indicates that the first and second clamp members are axially separated by a predetermined distance. Optionally the predetermined distance between the first and second clamp members corresponds to the axial distance between the protrusions on opposing conduits of the conduit connection before the connection is separated. Optionally the indicator allows the axial distance between the first and second clamp members to be set equal to the axial distance between the protrusions on each opposing conduit of the connection, optionally before the first and second clamp members engage with the conduits. Optionally the indicator comprises a mark (e.g. a groove), which optionally aligns with a surface (optionally an axially inner surface) of the second clamp member when the first and second clamp members are axially separated by the predetermined distance.

Optionally at least one guide rod (optionally each of the guide rods) has a locking device to lock the connection between a clamp member (optionally the second clamp member) and the at least one guide rod. Optionally the locking device restricts relative axial movement between the second clamp member at least one guide rod, and optionally the locking device restricts relative axial movement of the first and second clamp members, optionally while permitting pivotal movement of the two clamp members to close and open around the conduit. Optionally the locking device comprises an elongate member (e.g. a rod or pin) adapted to be received through an aperture in at least one guide rod, and optionally in at least one cap or collar fixed to a clamp member (optionally the second clamp member). Optionally each collar is fixed to a bearing device disposed within an aperture in the second clamp member. Optionally the locking device is attached (e.g. tethered) to a clamp member (optionally the second clamp member).

Optionally the locking device is received through an aperture in the at least one guide rod, and optionally through at least one collar when the apertures are aligned. Optionally the apertures in the at least one guide rod and collar are aligned when the first and second clamp members are axially separated by a second predetermined distance. Optionally the second predetermined distance is greater than the first predetermined distance, and optionally the second predetermined distance corresponds to an axial distance between the at least one protrusion on opposing sections of the conduit connection after the connection is separated. Optionally the locking device can be engaged to restrict or substantially prevent relative axial movements of the first and second clamp members when the clamp members are axially separated by the second predetermined distance. When the locking device is engaged, relative axial movement of the first and second clamp members, optionally due to loss of power to the first and second drive mechanisms, or optionally due to inadvertent activation of the first and second drive mechanisms, is restricted or substantially prevented. Optionally each guide rod has a respective locking device.

Optionally a first drive mechanism connects a first clamp segment of the first clamp member to a first clamp segment of the second clamp member, and optionally a second drive mechanism connects a second clamp segment of the first clamp member to a second clamp segment of the second clamp member. Optionally the first and second drive mechanisms are adapted to drive axial movement of the first and second clamp members relative to each other in a direction parallel to the first and second axes. Optionally the first and second drive mechanisms resist movement of the first and second segments out of parallel alignment with one another during axial movement, optionally by synchronous driving of the first and second drive mechanisms. Optionally at least one drive mechanism is connected (e.g. fixed) to the first and second clamp members at respective first and second axial ends of the at least one drive mechanism.

Optionally the axial length of the at least one drive mechanism is variable. Optionally at least one drive mechanism is telescopic, and varies its axial length by telescoping. Optionally the drive mechanism comprises at least first and second portions, and optionally the first and second portions are adapted to axially overlap with each other, or optionally a first portion is received inside a second portion. Optionally the at least one drive mechanism comprises a hydraulic cylinder and piston arrangement. Optionally the or each cylinder and piston arrangement has a first end connected to the first clamp member and a second end connected to the second clamp member and is optionally arranged along an axis that is parallel to the first and second axes.

Optionally the first and second drive mechanisms share at least one common drive actuation system. Optionally the first and second drive mechanisms share a first common drive actuation system, which optionally permits synchronised actuation of the first and second drive mechanisms in a first direction (optionally in a first linear direction, optionally to axially extend the first and second drive mechanisms, optionally to increase the axial distance between the first and second clamp members). Optionally the first and second drive mechanisms are synchronised. In some examples, the first and second drive mechanisms share a second common drive actuation system, which optionally permits synchronised actuation of the first and second drive mechanisms in a second opposing direction (optionally in a second linear direction, optionally to axially retract the first and second drive mechanisms, optionally to decrease the axial distance between the first and second clamp members). Optionally the first and second common drive actuation systems each produce equal (optionally balanced) driving forces in each of the first and second drive mechanisms. Optionally the equal driving forces in each of the first and second drive mechanisms maintain alignment of the first and second clamp members as they move between axially retracted and expanded positions. Optionally the first and second drive mechanisms can drive the first and second clamp members in one direction only, e.g. apart, or together. Optionally movement in the opposite direction can be passive, or driven by another mechanism. Optionally the first and second drive mechanisms drive axial movement along an axis that is parallel to the guide rods.

Optionally the common drive actuation system comprises a hydraulic circuit, optionally comprising a hydraulic fluid reservoir containing pressurised hydraulic fluid, which is optionally in fluid communication with the first and second drive mechanisms through first and second fluid lines. Optionally pressurised hydraulic fluid in the first fluid line actuates the first and second drive mechanisms in a first direction, optionally extending the pistons of first and second hydraulic cylinders. Optionally pressurised hydraulic fluid in the second fluid line actuates the first and second drive mechanisms in an opposing second direction, optionally retracting the pistons of first and second hydraulic cylinders.

Optionally the at least one drive mechanism comprises an extension mechanism adapted to axially extend the drive mechanism, and optionally to increase the axial distance between the first and second clamp members. Optionally the at least one drive mechanism comprises a retraction mechanism adapted to axially retract the drive mechanism, and optionally to decrease the axial distance between the first and second clamp members.

Optionally where first and second drive mechanisms are provided, the extension mechanisms of the first and second drive mechanisms are operatively linked, and optionally the retraction mechanisms of the first and second drive mechanisms are operatively linked. Optionally the operatively linked extension mechanisms produce an equal driving force in the first and second drive mechanisms (optionally on the push stroke of at least one hydraulic cylinder), and optionally the operatively linked retraction mechanisms also produce an equal driving force (optionally on the pull stroke of at least one hydraulic cylinder), optionally in an opposing direction to the driving force produced by the extension mechanisms. Optionally the operatively linked extension and retraction mechanisms of the first and second drive mechanisms drive axial movement of the first and second clamp members synchronously with each other, optionally maintaining alignment of the first and second clamp members.

Optionally the clamp assembly further comprises at least one clamp portion removal mechanism, which is optionally adapted to remove (optionally to support) at least one portion of the conduit connection, optionally a housing around the conduit connection, optionally a clamp around the conduit connection. Optionally the clamp assembly comprises two clamp portion removal mechanisms. Optionally a first clamp portion removal mechanism is disposed on a first clamp segment of the first clamp member, and optionally a second clamp portion removal mechanism is disposed on a second clamp segment of the first clamp member. Optionally the clamp portion removal mechanisms are adapted to remove portions of the conduit connection from opposing sides of the conduit connection, and optionally to remove portions of the conduit connection in opposing radial directions relative to the conduit connection. Optionally the at least one clamp portion removal mechanism facilitates easy removal of one or more portions of the conduit connection which must be removed to gain access to the internal components of the conduit connection, and optionally reduces the time required to replace the one or more portions of the conduit connection.

Optionally the at least one clamp portion removal mechanism comprises a rail, and optionally a bracket. Optionally the bracket is pivotally connected to the rail (optionally at a distal end of the rail), and optionally the rail has a sliding connection with the first clamp member, optionally with a first or second clamp segment of the first clamp member. Optionally the rail is slidable, optionally in a generally radial direction relative to the conduit connection, optionally in a direction perpendicular to the axes of the first and second guide rods. Optionally the bracket is movable in a first direction (optionally generally away from the conduit connection) and an opposing second direction (optionally generally toward the conduit connection). Optionally the rails of the first and second clamp portion removal mechanisms are disposed approximately parallel to each other, and optionally the first direction of movement (e.g. away from the conduit connection) of each of the brackets of the first and second clamp portion removal mechanisms are in opposing directions, optionally in opposing radial directions relative to the conduit connection.

Optionally the bracket of each clamp portion removal mechanism rotates relative to the rail, optionally in a plane that is parallel with the rail, and optionally parallel to the axes of the first and second guide rods. Optionally the bracket is connected to the rail by a pivot connection. Optionally the bracket rotates at least 90 degrees, optionally from 90 degrees to 180 degrees, optionally approximately 180 degrees, typically around the pivot connection. Optionally the bracket rotates from a first position, in which it optionally faces away from the conduit connection, to a second position, in which it optionally faces toward the conduit connection. Optionally the bracket is adapted to be removably connected to a portion of the conduit connection. Optionally the bracket receives a fixing or fastener, optionally to temporarily secure it to a portion of the conduit connection, optionally while the portion of the conduit connection is joined to the conduit connection.

Optionally the sliding (optionally linear) movement of the rail, and optionally the pivotal (optionally rotational) movement of the bracket, allow at least one portion of the conduit connection to be removed (e.g. displaced) from the conduit connection (and optionally allowing substantially unobstructed access to the conduit connection), while remaining fixed to the clamp assembly.

Optionally the rail of each clamp portion removal mechanism incorporates a restraint mechanism, which optionally restricts, optionally substantially prevents, sliding movement of the rail relative to the first clamp member. Optionally the rail restraint mechanism comprises a rail brake, which is optionally tightened or loosened (optionally manually e.g. by hand) to respectively restrain or release the rail. Optionally the rail restraint mechanism can be engaged when the rail is in any position relative to the first clamp member.

Optionally the bracket of each clamp portion removal mechanism incorporates a restraint mechanism, which optionally restricts, optionally substantially prevents, rotational movement of the bracket relative to the rail. Optionally the bracket restraint mechanism comprises a locking pin, which is optionally inserted or removed through the bracket and the rail to respectively lock or free the bracket. Optionally the bracket restraint mechanism can be engaged only when the bracket is orientated in (optionally close to) its positions of maximum rotation relative to the rail.

A method of breaking a connection in a pressurised flowline of an oil or gas well is also provided. The method may include using a clamp assembly. The clamp assembly may include:
first and second clamp members, each of the first and second clamp members having at least first and second interconnected clamp segments, the first clamp segment being pivotally moveable with respect to the second clamp segment;
at least one first guide rod with a first axis connecting a first clamp segment of the first clamp member to a first clamp segment of the second clamp member, and at least one second guide rod with a second axis connecting a second clamp segment of the first clamp member to a second clamp segment of the second clamp member, wherein the first and second axes of the first and second guide rods are parallel; and
a drive mechanism connecting the first clamp member to the second clamp member, wherein the method comprises:
closing the clamp segments of the first and second clamp members around the conduit and engaging the first and second clamp members with the flowline; and
driving axial movement of the first and second clamp members away from each other to break the conduit connection, wherein the guide rods permit relative axial movement of the first and second clamp members in a direction parallel to the first and second axes while maintaining alignment of the first and second clamp members.

Optionally the method includes rotating the clamp assembly around the conduit connection after the first and second clamp members have been closed around the conduit connection, optionally before driving axial movement of the first and second clamp members to break the conduit connection. Optionally the latching devices for latch the first clamp segments to the second clamp segments can be partially locked (optionally partially tightened) while rotating the clamp assembly around the conduit connection.

Optionally the method includes driving axial movement of the first and second clamp members toward each other to re-make the conduit connection while the first and second clamp members are closed around the conduit connection.

In one or more embodiments, a bearing ring removal tool may include:
a cam member having one or more first and second cam surfaces at a first distal end, wherein the first and second cam surfaces are rotated by a force applied to an opposing second distal end of the cam member;
and a drive arm, the drive arm being pivotally connected to the cam member at a pivot point adjacent to the first and second cam surfaces,
wherein the cam member drives movement of the drive arm,
and wherein the first cam surface is spaced apart from the second cam surface,
and wherein the minimum radius of the second cam surface around the pivot point is greater than the maximum radius of the first cam surface around the pivot point.

Optionally the cam member drives movement of the drive arm in a direction perpendicular to a follower surface with which the first and second cam surfaces engage.

Optionally the first cam surface is arcuate, and optionally forms a portion of a circle e.g. an arc of a circle. Optionally the second cam surface is arcuate, and optionally forms a portion of a circle e.g. an arc of a circle. Optionally the radius of the arc of the first cam surface is larger than the radius of the arc of the second cam surface, optionally at least 2, or 3, or 5 times as large. Optionally the centres of the arcs of the first and second cam surfaces are offset from each other, and are optionally aligned on an axis passing through the pivot point. Optionally the centre of the arc of the first cam surface is closer to the pivot point than the centre of the arc of the second cam surface. Optionally the pivot point is disposed on an axis of the cam member.

Optionally the centres of the arcs of the first and second cam surfaces and the pivot point are aligned on the axis of the cam member.

Optionally the cam member comprises first and second segments, which are optionally symmetrical. Optionally a first cam surface and a second cam surface is disposed at distal ends of both the first and second cam member segments. Optionally the opposing second distal ends of the cam member segments are interconnected, optionally by a force application segment, optionally by a handle. Optionally a pivot point is disposed on the first and second cam member segments, and optionally the drive arm is pivotally connected to the first and second cam member segments, optionally at the distal ends of the drive arm.

Optionally an inner portion of the drive arm (optionally intermediate the distal ends of the drive arm) is arcuate, optionally semi-circular. Optionally the plane of the notional circle forming the semi-circular portion of the drive arm is oriented perpendicular to the direction of movement of the drive arm, and is optionally orientated parallel with the follower surface with which the first and second cam surfaces of the cam member are engaged. Optionally a portion (optionally the inner portion) of the drive arm is adapted to engage with a bearing ring, optionally with a radially extending lip (optionally a circumferential lip) disposed on an outer surface of the bearing ring.

Optionally the first and second cam surfaces contact the follower surface in sequence. Optionally when the first cam surface is engaged with the follower surface, the second cam surface is spaced apart from the follower surface, and optionally when the second cam surface is engaged with the follower surface, the first cam surface is spaced apart from the follower surface. Optionally the rate of movement of the pivot point (and optionally of the drive arm) is lower as the first cam surface rotates (optionally against the follower surface), and higher as the second cam surface rotates (optionally against the follower surface). Optionally the force produced by the drive arm (optionally against the bearing ring) is greater as the first cam surface rotates (optionally against the follower surface), and less as the second cam surface rotates (optionally against the follower surface).

Various aspects of one or more embodiments will now be described in detail with reference to the accompanying figures. Still other aspects, features, and advantages are readily apparent from the entire description thereof, including the figures, which illustrates a number of exemplary aspects and implementations. One or more embodiments are also capable of other and different examples and aspects, and its several details can be modified in various respects, all without departing from the spirit and scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

BRIEF DESCRIPTION OF THE DRAWINGS

In the accompanying drawings:

FIGS. 3a and 3b are respectively a perspective view of the clamp assembly shown in FIG. 1, and a detailed section view of a guide rod locking device;

FIG. 4 is a side section view of a flowline connection;

FIGS. 7a to 7l are a sequence of perspective views of a second example of a clamp assembly which includes optional clamp removal gantries, showing sequential steps in one possible mode of operation of the second example; and FIG. 7m is a view of a possible modification of the clamp assembly in FIGS. 7a-7l, showing internal detail of a possible recess with more than one slot.

DETAILED DESCRIPTION

Figure 1A:
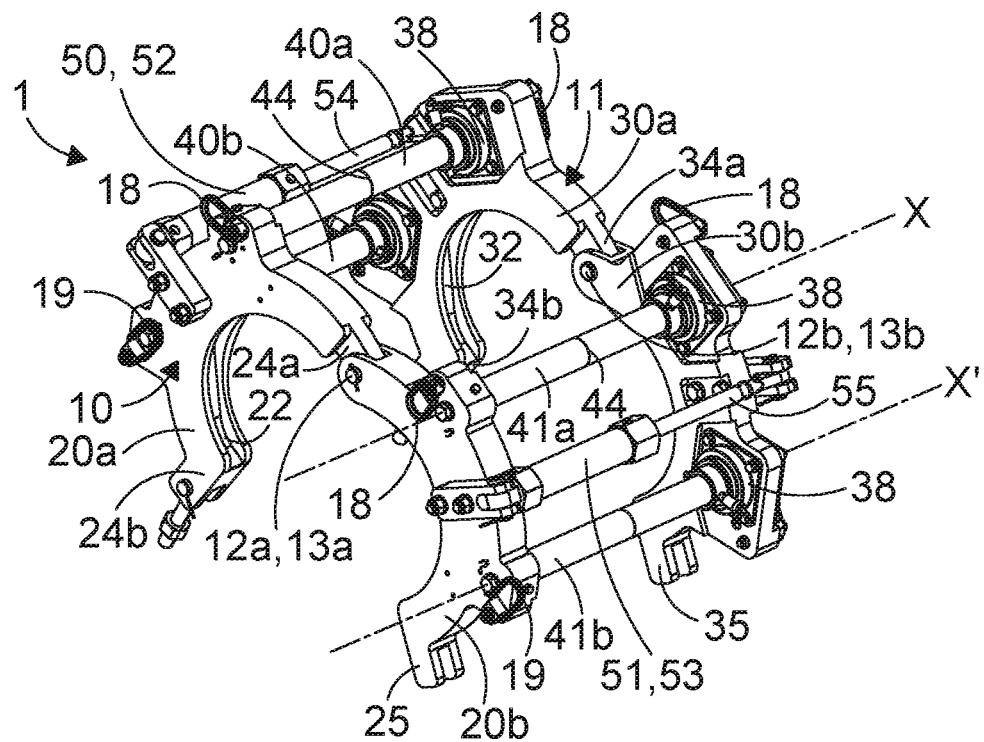
FIGS. 1a and 1b are respectively perspective and end elevation views of an example of a clamp assembly.

Referring now to the drawings, a first example of a clamp assembly 1 in accordance with one or more embodiments is shown in FIG. 1a. The clamp assembly 1 comprises first and second clamp members 10, 11. In this example first clamp member 10 comprises first and second clamp segments 20a, 20b, and second clamp member 11 comprises first and second clamp segments 30a, 30b, but in other examples each clamp member 10, 11 may comprise more than two clamp segments. The first and second clamp segments 20a, 20b of the first clamp member 10 are connected by a hinge 12a, and the first and second clamp segments 30a, 30b of the first clamp member 11 are connected by a hinge 12b. Also in this example the first clamp segments 20a, 30a of clamp members 10, 11 are interconnected by two guide rods 40a, 40b and a hydraulic cylinder 50, and the second clamp segments 20b, 30b of clamp members 10, 11 are interconnected by two guide rods 41a, 41b and a hydraulic cylinder 51. In other examples there may be more or fewer guide rods, or more hydraulic cylinders, and the numbers of guide rods and hydraulic cylinders need not be equal (or in the other words, symmetrical) between the first clamp segments 20a, 30a and the second clamp segments 20b, 30b. In this example, the axes of the guide rods 40a, 40b, 41a, 41b and hydraulic cylinders 50, 51 (axis X of guide rod 41a and axis X' of guide rod 41b shown for illustration in FIG. 1a) are all mutually parallel. Instead of the hydraulic cylinders 50, 51 the assembly could optionally use any drive mechanism capable of bidirectional axial movement, for example, any type of mechanical, hydraulic or pneumatic linear actuators e.g. leadscrews or pneumatic cylinders.

In this example each of the clamp segments 20a, 20b, 30a and 30b are generally semi-circular (or C-shaped), and are formed e.g. machined or milled from high-strength aluminium, optionally from a single e.g. integral plate of high-strength aluminium, but in other examples the clamp segments can be formed from other materials, or can be formed from discrete components that are fixed together, such as two or more plates separated by intermediate spacer elements which are bolted or otherwise fastened together.

Figure 1B:
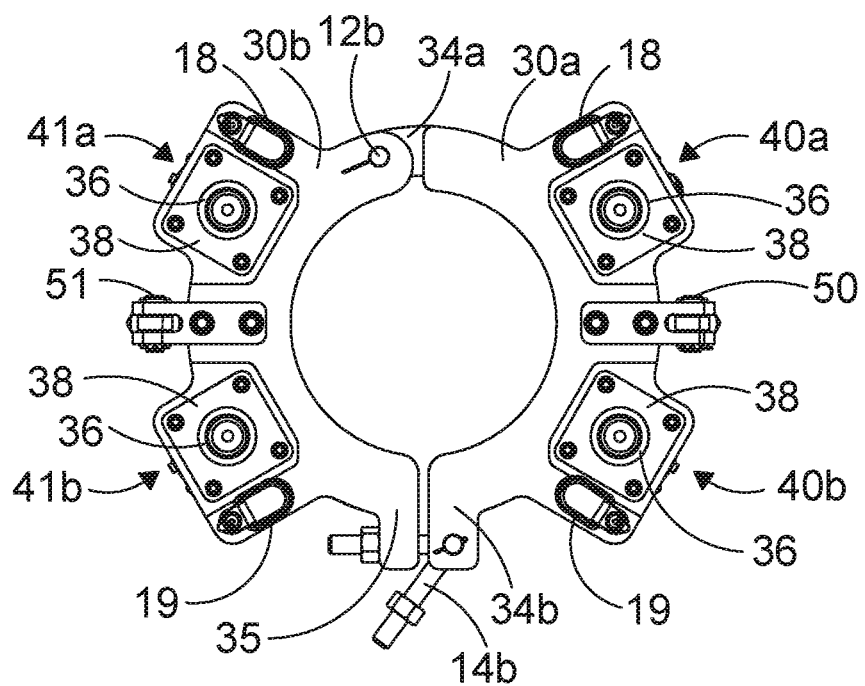

Also in this example, as best seen in FIG. 1b, clamp segment 30a comprises end portions 34a, 34b at opposite distal ends of the clamp segment 30a, while clamp segment 30b comprises an end portion 35 at one distal end of the clamp segment. FIG. 1b shows only the second clamp member 11, but the skilled reader will understand that the first clamp member has equivalent features not in view in FIG. 1b, particularly end portions 24a, 24b of clamp segment 20a, and end portion 25 of clamp segment 20b. End portions 24a, 24b, 25, 34a, 34b, 35 of clamp segments 20a, 20b, 30a, 30b are adjacent to the semi-circular portions of the clamp segments. Hinges 12a, 12b and swing bolts 14a, 14b are disposed at the end portions of the clamp segments 20a, 20b, 30a, 30b, as will be described in more detail below.

In this example, the inner surfaces of the clamp segments 20a, 20b, 30a and 30b are symmetrical, arcuate and optionally semi-circular. Thus, when the clamp segments 20a, 20b of clamp member 10, and the clamp segments 30a, 30b of clamp member 11 are closed, the inner surfaces of the clamp segments 20a, 20b and 30a, 30b optionally have the same radius, and form generally circular apertures in the clamp members 10, 11, which have an inner diameter approximately equal to an outer diameter of a flowline connection 70 (seen in FIG. 4). The centres of the circular apertures of the closed clamp members 10, 11 are aligned along an axis that is parallel with the axes of the guide rods 40a, 40b, 41a, 41b and hydraulic cylinders 50, 51.

As also shown in FIG. 1a, in this example the inner surfaces of clamp segments 20a, 20b, 30a and 30b are recessed, to form grooves or recesses 22, 32, that extend at least partially, or optionally fully, around the arcuate inner surface of the clamp segments. Thus the recesses 22, 32 are at least partially annular. In this example the axial separation between the recesses 22, 32 is approximately equal to the axial separation between the load shoulders 74a, 74b of flowline connection 70 (seen in FIG. 4), and the radial depth of the recesses 22, 32 is approximately equal to or greater than the radial protrusion of the load shoulders 74a, 74b beyond the outer surface of the flowline connection adjacent to the load shoulders. The load shoulders 74a, 74b are thus in this example of a suitable dimension to be received within the recesses 22, 32.

In this example a first end portion 24a of clamp segment 20a is pivotally joined by hinge 12a to an end of clamp segment 20b, and similarly, a first end portion 34a of clamp segment 30a is pivotally joined by hinge 12b to an end of clamp segment 30b. The hinges 12a, 12b are generally equivalent. The first end portions 24a, 34a of clamp segments 20a, 30a comprise hinge leaves which extend circumferentially from each semi-circular clamp segment, and which have a reduced width (e.g. in an axial direction) relative to the clamp segments 20a, 30a. Also, the ends of clamps segments 20b, 30b are optionally bifurcated to form a recess whose axial width is approximately equal to the width of the first end portions 24a, 34a of clamp segments 20a, 30a. Apertures are disposed in an axial direction (parallel to the axis of the clamp assembly) through the first end portions 24a, 34a of clamp segments 20a, 30a, and through the ends of clamp segments 20b, 30b. The first end portions 24a, 34a of clamp segments 20a, 30a are positioned within the bifurcations at the ends of clamp segments 20b, 30b such that the apertures through the first end portions 24a, 34a and clamp segments 20a, 30 are aligned with each other. Pins 13a, 13b are inserted through the aligned apertures, and can be secured in position with secondary fasteners, for example split pins or e-clips.

In this example second end portions 24b, 34b of clamp segments 20a, 30a and end portions 25, 35 of clamp segments 20b, 30b are also bifurcated. Swing bolts 14a, 14b are pivotally tethered to the second end portions 24b, 34b of clamp segments 20a, 30a, for example by mounting on a pivot pin. Also in this example swing bolts 14a, 14b comprise a threaded shaft or bolt and one or more threaded nuts on the bolt. For example, each swing bolt 14a, 14b may have a first nut for tightening the swing bolt when the first and second clamp members 10, 11 are closed, and a second locking nut to secure the position of the first nut after the swing bolts have locked the closed first and second clamp members. Thus the nuts can be loosened to unfasten the swing bolts without completely removing the nut from the shaft of the swing bolt, thereby reducing the risk of dropped objects.

As best seen in FIG. 1b, swing bolts 14a, 14b can be rotated around the pivot pins disposed in second end portions 24b, 34b of clamp segments 20a, 30a between a locked position in which the swing bolts are engaged with the end portions 25, 35 of clamp segments 20b, 30b, and an unlocked position in which the swing bolts are spaced apart from the end portions 25, 35, and free to rotate around the second end portions 24b, 34b of clamp segments 20a, 30a. When the first and second clamp members 10, 11 are closed around flowline connection 70, the swing bolts 14a, 14b engage with end portions 25, 35 to lock together and secure the first and second clamp segments 20a, 20b and 30a, 30b of each clamp member 10, 11. Typically the second end portions 24b, 34b of clamp segments 20, 30a abut the end portions 25, 35 of clamp segments 20b, 30b when the first and second clamp members 10, 11 are closed, but the swing bolts 14a, 14b may lock and secure the clamp members even if the end portions 24b, 34b and 25, 35 are slightly spaced apart when the clamp members are closed.

In this example guide rods 40a, 40b are mounted between clamp segments 20a and 30a, and guide rods 41a, 41b are mounted between clamp segments 20b and 30b. The guide rods 40a, 40b, 41a, 41b are mounted perpendicular to the outer surfaces of clamp members 10, 11, or in other words, perpendicular to the plane of the apertures formed by clamp members 10, 11 when they are closed. Also in this example, as best seen in FIG. 1b, the guide rods 40a, 40b and 41a, 41b are mounted symmetrically on clamp segments 20a, 30a and 20b, 30b, and are spaced further from the ends of the semi-circular portions of the clamp segments than from each other. In other words, in this example the guide rods 40a, 40b and 41a, 41b are mounted on semi-circular clamp segments 20a, 30a and 20b, 30b at respective angular positions of approximately 60 degrees and 120 degrees around the arc of the clamp segments. In other examples, particularly where there are fewer than or more than two guide rods per pair of clamp segments, the guide rods need not be regularly or symmetrically spaced.

Optionally a first axial end of each of the guide rods 40a, 40b and 41a, 41b is rigidly fixed to respective clamp segments 20a, 20b of the first clamp member 10. For example, bolts can be passed through a side surface of clamp segments 20a, 20b to engage with a coaxial threaded bore of the guide rods, which are then tightened to fix the guide rods to the opposing side surface of the clamp segments 20a, 20b.

The second axial end of each of the guide rods 40a, 40b and 41a, 41b is moveably (e.g. slidably) connected to respective clamp segments 30a and 30b of the second clamp member 11. In this example guide rods 40a, 40b and 41a, 41b extend through bores 36 (shown in FIG. 1b) through the side surfaces of respective clamp segments 30a and 30b. Also in this example, ball bearings 38 (e.g. linear ball bearings) are optionally disposed within the bores 36, which allow the guide rods 40a, 40b and 41a, 41b to slide axially through the clamp segments 30a and 30b, but restrict the guide rods from significant deviation from a perpendicular orientation with respect to the clamp segments. In other words, the linear ball bearings 38 maintain the axes of the guide rods 40a, 40b and 41a, 41b in parallel alignment with the direction of axial movement of the first clamp member 10 relative to the second clamp member 11. In this example each linear ball bearing 38 also comprises a collar with an aperture 39 (best seen in FIG. 2a) adjacent the side surfaces of clamp segments 30a, 30b facing clamp segments 20a, 20b.

Also in this example, an indicator in the form of a score or groove 44 (best seen in FIG. 1a and FIG. 6b) is provided on an outer surface of each of the guide rods 40a, 40b, 41a, 41b. The indicator grooves 44 optionally extend circumferentially around each of the guide rods. The indicator grooves 44 are positioned axially on the guide rods so that when the first and second clamp members 10, 11 are in the axially retracted position, or in other words when the axial spacing between first and second clamp members corresponds to the axial spacing between load shoulders 74a, 74b of flowline connection 70, the indicator grooves 44 align with the collars of linear ball bearings 38. Thus, the first and second clamp members 10, 11 are correctly positioned to engage with the flowline connection 70 when the indicator grooves 44 are immediately adjacent to (e.g. just visible beside) the collars of linear ball bearings 38.

In this example, apertures 46 (best seen in FIG. 3b) extend diametrically (e.g. perpendicular to the axis) through each of the guide rods 40a, 40b, 41a, 41b. The apertures 46 are positioned axially on the guide rods so that when the first and second clamp members 10, 11 are in the axially expanded position, the apertures 46 align with the apertures 39 through the collars of linear ball bearings 38.

In this example a first hydraulic cylinder 50 is mounted between clamp segments 20a and 30a, and a second hydraulic cylinder 51 is mounted between clamp segments 20b and 30b. The hydraulic cylinders 50, 51 are mounted parallel to the guide rods 40a, 40b, 41a, 41b, and in this example are disposed intermediate the guide rods connecting respective clamp segments 20a, 30a and 20b, 30b. Optionally the axial ends of each of the hydraulic cylinders 50, 51 are rigidly fixed to respective clamp segments 20a, 20b of the first clamp member 10 and clamp segments 30a, 30b of the second clamp member 11, adjacent to the outer surfaces of the clamp segments 20a, 20b and 30a, 30b. In this example, the cylinders 52, 53 of hydraulic cylinders 50, 51 are joined to the clamp segments 20a, 20b of the first clamp member 10, and the pistons 54, 55 are joined to the clamp segments 20b, 30b of the second clamp member 11. Alternatively, the cylinders 50, 51 could be in the opposite orientation.

Figure 2A:
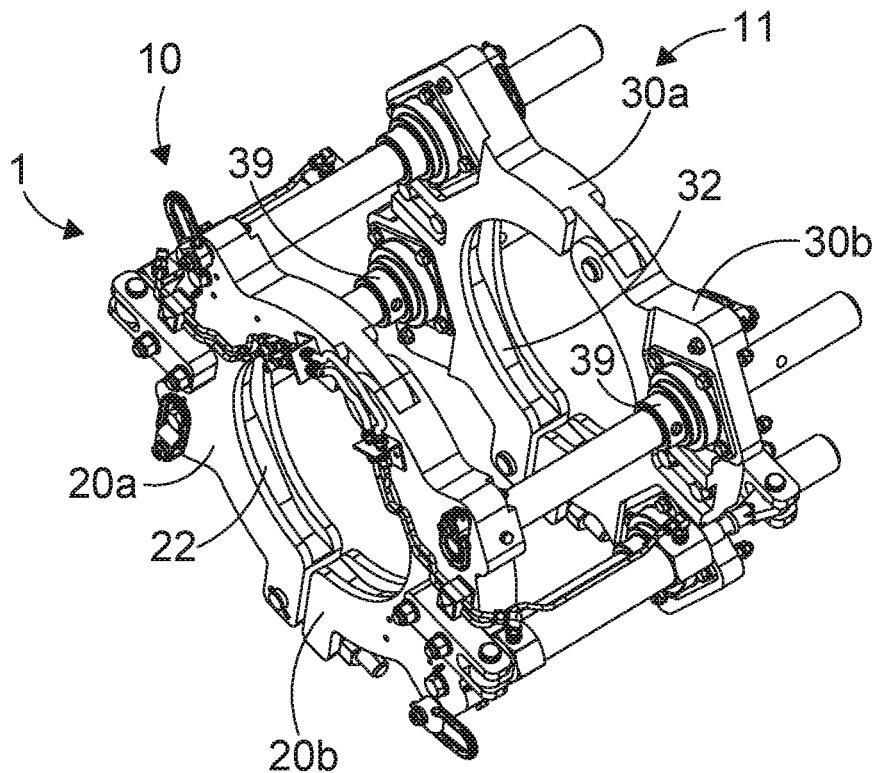
FIGS. 2a and 2b are perspective views of the clamp assembly shown in FIG. 1, illustrating the clamp segments in the closed position and the clamp members in the axially retracted position.
Figure 2B:
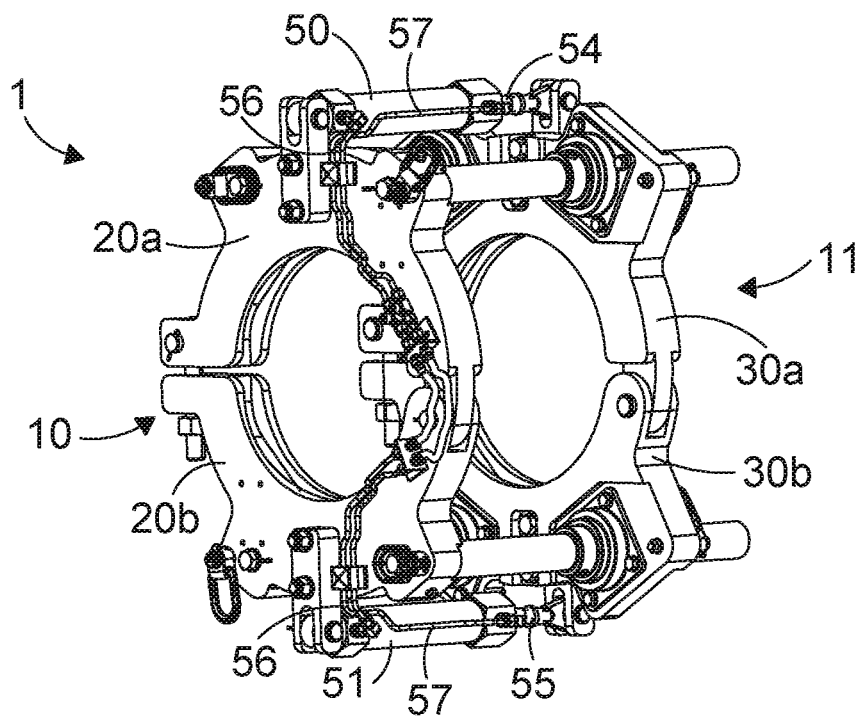

As best seen in FIG. 2b, in this example both hydraulic cylinders 50, 51 share a common 'push' stroke line 56 and a common 'pull' stroke line 57, each in a direction parallel with the axes of the guide rods 40a,b and 41a,b. Typically the 'push' and 'pull' stroke lines supply pressurised hydraulic fluid from a single source (e.g. reservoir) to different hydraulic chambers within the hydraulic cylinders 50, 51. For example, the 'push' stroke line supplies pressurised hydraulic fluid to corresponding first chambers of hydraulic cylinders 50, 51 to extend the pistons 54, 55 and move the clamp members 10, 11 toward their axially expanded position, and the 'pull' stroke line supplies pressurised hydraulic fluid to corresponding second chambers of hydraulic cylinders 50, 51 to retract the pistons 54, 55 and move the clamp members 10, 11 toward their axially retracted position.

Figure 5A:
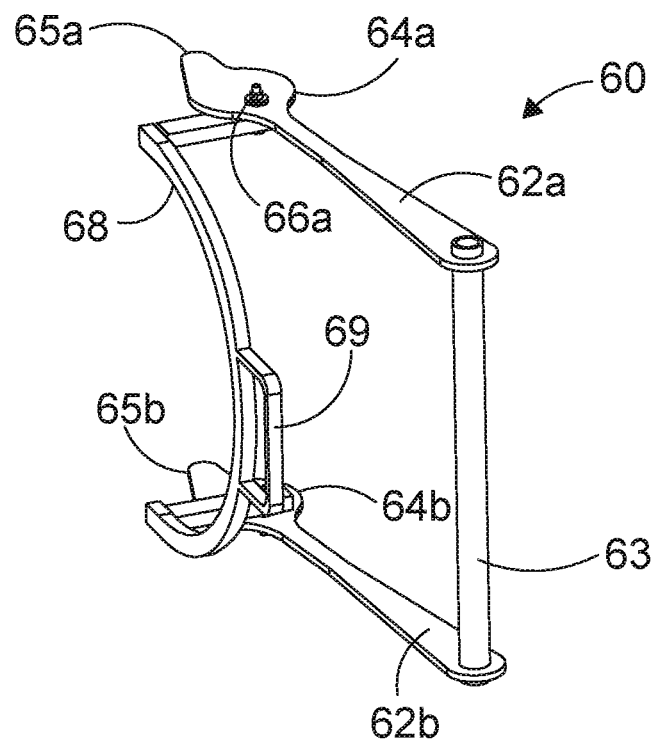
FIGS. 5a and 5b are respectively perspective and side elevation views of an example of a bearing ring removal tool.
Figure 5B:
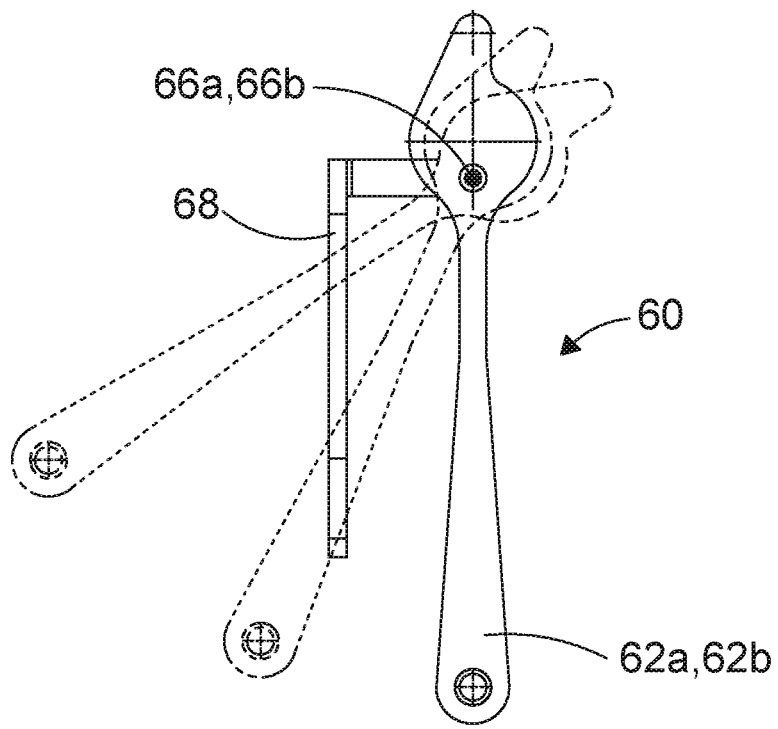

A bearing removal tool 60 is shown in FIGS. 5a and 5b. As will be explained in more detail below, after the clamp assembly 1 has been operated in order to separate the flowline connection 70 and provide access to the bearing ring 76 and/or seals 78a, 78b (seen in FIG. 4), for example for routine maintenance or replacement, the bearing ring can be difficult to remove from the end of a flowline section 72a, 72b after the ends of the flowline sections have been separated. The bearing removal tool 60 allows the bearing ring 76 to be removed from the end of flowline section 72a or 72b.

In this example the bearing removal tool 60 comprises two cam arms 62a, 62b which are interconnected by a handle 63. The cam arms 62a, 62b are generally similar to each other and are orientated in the same direction as each other. The handle 63 is disposed perpendicular to the cam arms 62a, 62b, and is rigidly fixed to the cam arms at a first distal end of the cam arms. The opposing second distal end of each of the cam arms 62a, 62 comprises a first cam surface 64a, 64b and a second cam surface 65a, 65b. Pivot points 66a, 66b are disposed on the cam arms 62a, 62b adjacent to the first and second cam surfaces 64a, 64b, 65a, 65b.

Cam surfaces 64a, 64b and 65a, 65b are defined by their changing (e.g. increasing) distance or radius from pivot points 66a, 66b. As best seen in FIG. 5b, in this example the radius of first cam surfaces 64a, 64b from pivot points 66a, 66b increases gradually around the first cam surfaces, and the radius of second cam surfaces 65a, 65b increases and then decreases relatively sharply around the second cam surfaces. Also in this example, the maximum radius of the first cam surfaces 64a, 64b is less than the maximum radius of the second cam surfaces 65a, 65b.

Also in this example the bearing removal tool 60 further comprises a drive arm 68. The distal ends of the drive arm 68 are pivotally connected to the cam arms 62a, 62b at pivot points 66a, 66b, such that the cam arms can rotate relative to the drive arm. In this example an inner portion of the drive arm 68 is semi-circular, with an inner diameter that is slightly larger than the outer diameter of the outer surface of bearing ring 76, but slightly smaller than the outer diameter of a shoulder or lip 77 disposed on the outer surface of the bearing ring 76. The end portions of the drive arm 68 which are pivotally connected to cam arms 62a, 62b are straight, and are orientated perpendicular to the plane of the notional circle forming the semi-circular inner portion of the drive arm. Optionally a secondary handle 69 is fixed to the semi-circular inner portion of the drive arm 68, approximately midway around the arc of the semi-circular inner portion.

In operation, the hydraulic cylinders 50, 51 of the clamp assembly 1 are first activated to move the clamp members 10, 11 into their axially retracted position, in which the second clamp member 11 is aligned with the indicator grooves 44 of the guide rods 40a, 40b, 41a, 41b, as illustrated in FIGS. 2a and 2b. In this position, the clamp members 10, 11 are axially separated by a distance equivalent to the axial separation of the load shoulders 74a, 74b of flowline connection 70 (when made up), and so the recesses 22, 32 of the clamp segments 20a, 20b, 30a, 30b will engage with the load shoulders 74a, 74b when the clamp members 10, 11 are closed around the flowline.

The clamp assembly 1 is then manoeuvred into position above the flowline connection 70 by supporting (e.g. suspending) the clamp assembly from lifting eyes 18 with a suitable hoisting or lifting device, such as a crane or forklift. Typically the clamp assembly 1 is manoeuvred to a point vertically above the flowline connection 70, and rotated horizontally so that the clamp members 10, 11 are approximately aligned with the load shoulders 74a, 74b of the flowline connection.

The clamp members 10, 11 of the clamp assembly 1 are then opened, for example by manually pulling the end portions 24b, 34b of first clamp segments 20a, 30a away from the end portions 25, 35 of second clamp segments 20b, 30b. In this example the end portions 24b, 34b can be separated from the end portions 25, 35 by at least 15 inches (0.381 metres) when the clamp members 10, 11 are opened (e.g. before being lowered onto the flowline connection 70), and optionally can be separated by up to about 26 inches (0.660 metres), depending on the extent of relative rotation between the first and second clamp segments 20a, 20b and 30a, 30b, but in other examples the distances between the separated end portions 24b, 34b, and 25, 35 may be smaller or greater than this, for example to accommodate flowline connections having smaller or greater maximum outer diameters. Typically the lifting eyes 18 are positioned on the first and second clamp segments 20a, 20b, 30a, 30b a suitable distance away from pivots 12a, 12b e.g. approximately aligned with the first guide rods 40a, 41a to ensure that the weight of the clamp assembly 1 does not strongly urge the clamp members 10, 11 toward the open or closed position. In this example the lifting eyes 18 are positioned a suitable distance from pivots 12a, 12b to provide the clamp members 10, 11 with a slight bias toward the closed position. Alternatively in this example, the clamp assembly 1 can be suspended from lifting eyes 18 of the first clamp segments 20a, 30a, and from auxiliary lifting eyes 19 of the second clamp segments 20b, 30b (or vice versa), which optionally provides the clamp members 10, 11 with a slight bias toward the open position, which can allow the clamp assembly 1 to be more easily lowered onto the flowline connection 70. In this case, the clamp members 10, 11 are typically closed manually around the flowline connection 70 once the clamp assembly 1 is in position around the flowline connection.

The clamp assembly 1 is then lowered onto the flowline connection 70 so that the first clamp segments 20a, 30a pass down one side of the flowline connection, and the second clamp segments 20b, 30b pass down the other side of the flowline connection.

The clamp members 10, 11 are then closed around the flowline connection 70, for example by pushing the end portions 24b, 34b of first clamp segments 20a, 30a toward the end portions 25, 35 of second clamp segments 20b, 30b, or the clamp members 10, 11 may optionally be sufficiently biased to move toward the closed position without intervention. As the clamp members 10, 11 are closed, the recesses 22, 32 of the clamp segments 20a, 20b, 30a, 30b engage with the load shoulders 74a, 74b of the flowline connection 70. The swing bolts 14a, 14b are then rotated from their unlocked positions to their locked positions in which they are engaged with the end portions 25, 35 of second clamp segments 20b, 30b, and in this example, the bolts of the swing bolts 14a, 14b are partially tightened (e.g. hand tightened) to hold the clamp members 10, 11 in their closed positions, while allowing rotation of the clamp assembly 1 around the flowline connection 70.

Prior to separating the flowline connection 70, a locking clamp 71 around the flowline connection is first removed to allow the flowline sections 72a, 72b of the flowline to be moved apart from each other. Typically the locking clamp 71 comprises a cylinder-shaped body that can be radially removed from the flowline connection 70 as two equal half segments 71a, 71b from either side of the flowline connection, in opposing directions. To facilitate this, the clamp assembly 1 can be rotated a quarter turn (e.g. about 90 degrees) around the flowline connection 70, from the orientation shown in FIG. 2a to the orientation shown in FIG. 2b. After fully tightening the swing bolts 14a, 14b to secure the flowline connection 70 within the clamp assembly 1, the segments 71a, 71b of the locking clamp 71 can be loosened and disconnected, and then radially removed in a horizontal direction from the flowline connection 70, between the guide rods of opposing clamp segments e.g. between the guides rods 40a, 41a on one side of the flowline connection, and between the guide rods 40b, 41b on the other side of the flowline connection.

Figure 6A:
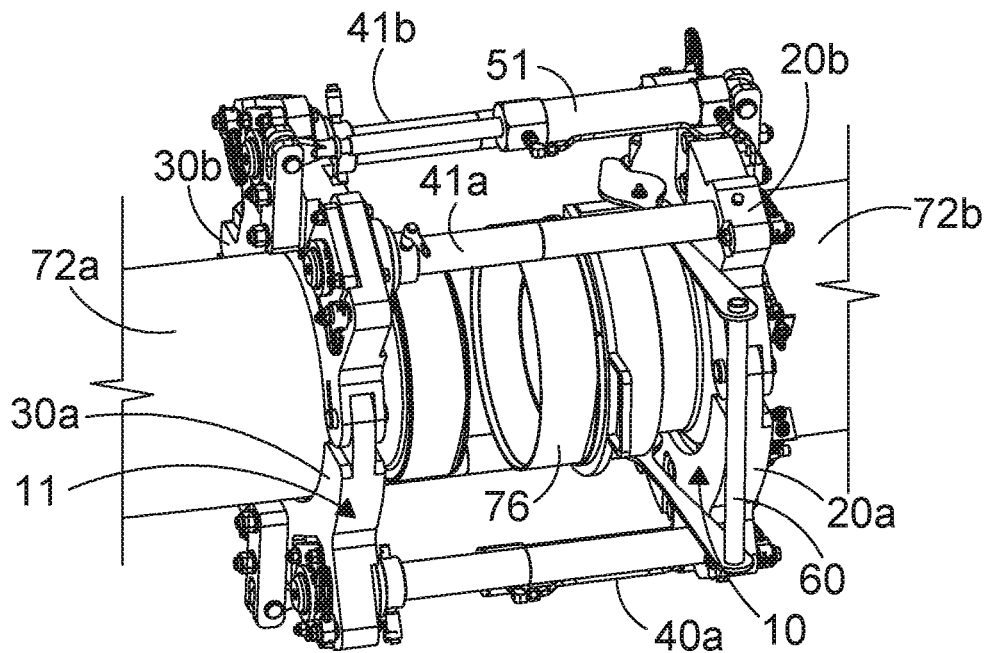
FIGS. 6a and 6b are perspective views of the clamp assembly shown in FIG. 1, respectively illustrating the clamp assembly rotated around the flowline connection to provide access for the bearing ring removal tool shown in FIGS. 5a and 5b which is engaged with a separated flowline connection, and the same flowline connection with the bearing ring removed and the clamp assembly rotated back to its initial position.
Figure 6B:
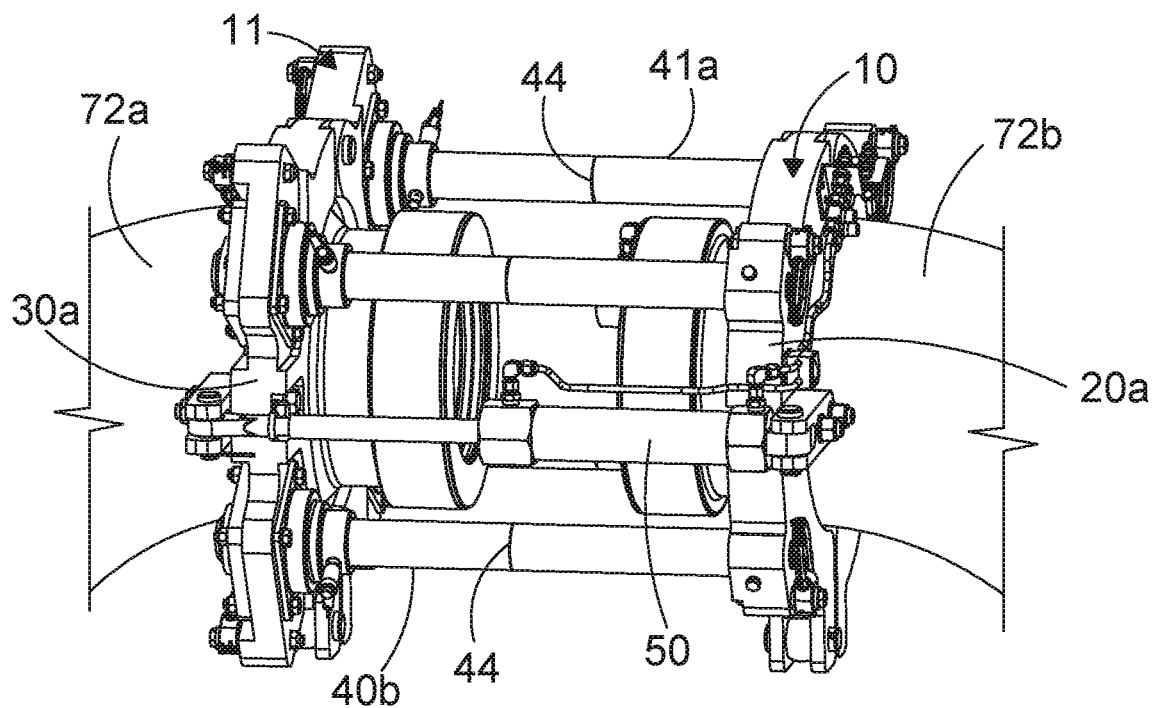

After the locking clamp 71 has been removed from the flowline connection 70, the hydraulic cylinders 50, 51 can be activated to extend the pistons 54, 55, thereby moving the clamp members 10, 11 into their axially expanded position in a direction parallel to the axes of the guide rods 40a,b and 41a,b, best seen in FIG. 6b. As the clamp members 10, 11 move apart, the load shoulders 74a of the first flowline section 72a are urged apart from the load shoulders 74b of the second flowline section 72b, thus separating the flowline sections 72a, 72b apart from each other. The axes of the two flowline sections 72a, 72b are maintained in alignment during the axial separation by the guide rods and the drive mechanism. Once the flowline connection 70 has been separated, but before any work is carried out on any of the internal components of the flowline connection, locking pins 16 are inserted through the aligned apertures 39, 46 of the collars of the linear ball bearings 38 and of the guide rods 40a, 40b, 41a, 41b. The locking pins 16 restrict movement of the guide rods 40a, 40b, 41a, 41b relative to the second clamp member 11, and thus prevent any significant axial movement of the first and second clamp members 10, 11 relative to each other.

Once the locking pins 16 are in place, the internal components of the flowline connection 70 can be safely accessed. The inner surfaces of the bearing ring 76 typically form a partial seal with flowline sections 72a, 72b (in addition to the seals formed by seal rings 78a, 78b), which results in the creation of a partial vacuum between the axial ends of flowline sections 72a, 72b and the axially-facing surfaces of the bearing ring, which can be difficult to overcome when separating the flowline connection 70. Typically when the clamp assembly 1 separates the flowline connection 70, the bearing ring 76 is removed from the flowline section 72a or 72b to which it adheres least, but remains attached to the flowline section 72a or 72b to which it adheres more strongly.

To remove the bearing ring 76 from the flowline section 72a or 72b, the bearing removal tool 60 is first inserted into the flowline connection, so that the drive arm 68 engages with the lip 77 of the bearing ring 76, and the first cam surfaces 64a, 64b engage with the side surfaces of clamp segments 20a, 20b, as shown in FIG. 6a. Note that if the bearing ring 76 had remained attached to the first flowline section 72a rather than the second flowline section 72b as shown in FIG. 6a, the first cam surfaces 64a, 64b of the bearing removal tool 60 could alternatively be engaged with the side surfaces of the clamp segments 30a, 30b.

The bearing removal tool 60 is then operated by applying a force, e.g. in an axial direction, typically by hand, to the handle 63 of the bearing removal tool 60, while supporting the position of the drive arm 68 against the lip 77 of the bearing ring 76 with the secondary handle 69. As the handle 63 is pulled in an axial direction away from the clamp segments 20a, 20b with which the first cam surfaces 64a, 64b are engaged, the first cam surfaces rotate against clamp segments 20a, 20b and urge the pivot points 66a, 66b axially away from the clamp segments 20a, 20b, which also drives the drive arm 68 axially away from the clamp segments 20a, 20b. Thus, the drive arm 68 begins to drive the bearing ring 76 away from the end of flowline section 72a. As best seen in FIG. 5b, because the radius of first cam surfaces 64a, 64b increases only gradually, a relatively large movement of handle 63 causes only a relatively small movement of pivot points 66a, 66b, but this small movement provides a correspondingly large mechanical advantage that is able to overcome the partial vacuum seal of the bearing ring 76 with the flowline section 72a. As the handle 63 is pulled further, second cam surfaces 65a, 65b make contact with clamp segments 20a, 20b, which lifts first cam surfaces 64a, 64b away from clamp segments 20a, 20b, as also illustrated in FIG. 5b. In this example, as best seen in FIG. 5b, the minimum radius of the second cam surfaces 65a, 65b is greater than the maximum radius of the first cam surfaces 64a, 64b. Therefore, after the second cam surfaces 65a, 65b have engaged the clamp segments 20a, 20b, further movement of handle 63 causes a relatively large movement of pivot points 66a, 66b axially away from the clamp segments 20a, 20b, but with a correspondingly smaller mechanical advantage. This allows the bearing removal tool 60 to completely remove the bearing ring 76 from the flowline section 72a by causing axial movement of the drive arm 68 that is equal to or greater than the axial length of the portion of flowline section 72a on which the bearing ring 76 was mounted. Once the bearing ring 76 has been moved off the flowline section 72a, it can be removed from the clamp assembly 1, for example by withdrawing it radially from the flowline connection 70 between guide rods 40a, 41a.

The procedure for replacing the bearing ring 76 and/or seals 78a, 78b, and re-making the flowline connection 70, is generally the reverse of the procedure for separating the flowline connection and removing the bearing ring 76 described previously. Referring again to FIG. 6a, the bearing ring 76 can be loosely mounted (e.g. by hand) on the end of either of flowline sections 72a or 72b. Preferably, the bearing ring 76 is checked to ensure that it is square with the flowline section (e.g. that the axis of the bearing ring 76 is coaxial with the axis of the flowline section 72a or 72b).

Before activating the hydraulic cylinders 50, 51 to retract the pistons 54, 55 and return the clamp members 10, 11 to their axially retracted position seen in FIGS. 2a and 2b, the locking pins 16 must first be removed from the guide rods 40a, 40b, 41a, 41b, to allow the guide rods to move axially relative to the second clamp member 11. The hydraulic cylinders 50, 51 can then be activated, and clamp members 10, 11 begin to approach each other, in a direction parallel to the axes of the guide rods 40a,b and 41a,b. As the clamp members 10, 11 move together, the load shoulders 74a of the first flowline section 72a are urged toward the load shoulders 74b of the second flowline section 72b, and the ends of flowline sections 72a, 72b are received into the ends of the bearing ring 76. The hydraulic cylinders 50, 51 deliver sufficient axial compression force to the clamp members 10, 11 to drive home the flowline sections 72a, 72b within the bearing ring 76 and engage the seals 78a, 78b.

Once the flowline connection 70 has been re-made, the locking clamp 71 is also replaced around the flowline connection, for example by returning the half segments of the locking clamp to the flowline connection and then reconnecting and tightening them together. The swing bolts 14a, 14b can then be partially loosened to allow the clamp assembly 1 to be rotated around the flowline connection 70 to its original position shown in FIG. 2a e.g. with the swing bolts 14a, 14b vertically below the flowline connection 70. The swing bolts 14a, 14b can then be fully loosened and moved toward the unlocked positions, thus releasing the end portions 25, 35 of second clamp segments 20b, 30b from the end portions 24b, 34b of first clamp segments 20a, 30a.

Finally, the clamp assembly 1 is re-attached to the hoisting or lifting device in order to at least partially support the clamp assembly while the clamp members 10, 11 are again opened, for example by manually pulling the end portions 24b, 34b of first clamp segments 20a, 30a away from the end portions 25, 35 of second clamp segments 20b, 30b. Once the first and second clamp segments 20a, 20b and 30a, 30b have been rotated relative to each away from the pipeline connection 70, the clamp assembly 1 can be lifted above and away from the flowline connection.

A second example of a clamp assembly 101 in accordance with one or more embodiments is shown in FIGS. 7a to 7l. The second example is generally similar to the first example described above, and equivalent parts are numbered similarly, but the reference numbers are increased by 100. In the second example, the clamp members 110, 111 (including hinges 112a, 112b (seen in FIG. 7b) and swing bolts 114a, 114b), guide rods 140a, 140b, 141a, 141b and hydraulic cylinders 150, 151 are all similar in form and function to the equivalent parts of the first example described above.

In this example, as seen in FIG. 7a, first and second optional clamp removal gantries 126a, 126b are connected respectively to clamp segments 120a, 120b of the first clamp member 110. Rail guides 121a, 121b are disposed on side surfaces of clamp segments 120a, 120b, generally diagonally opposite one another, approximately adjacent to the rigidly fixed ends of guide rods 140a and 141b. Rails 123a, 123b are slidable through the rail guides 121a, 121b, and clamp brackets 128a, 128b are pivotally connected to a first distal end of each rail 123a, 123b.

Figure 7C:
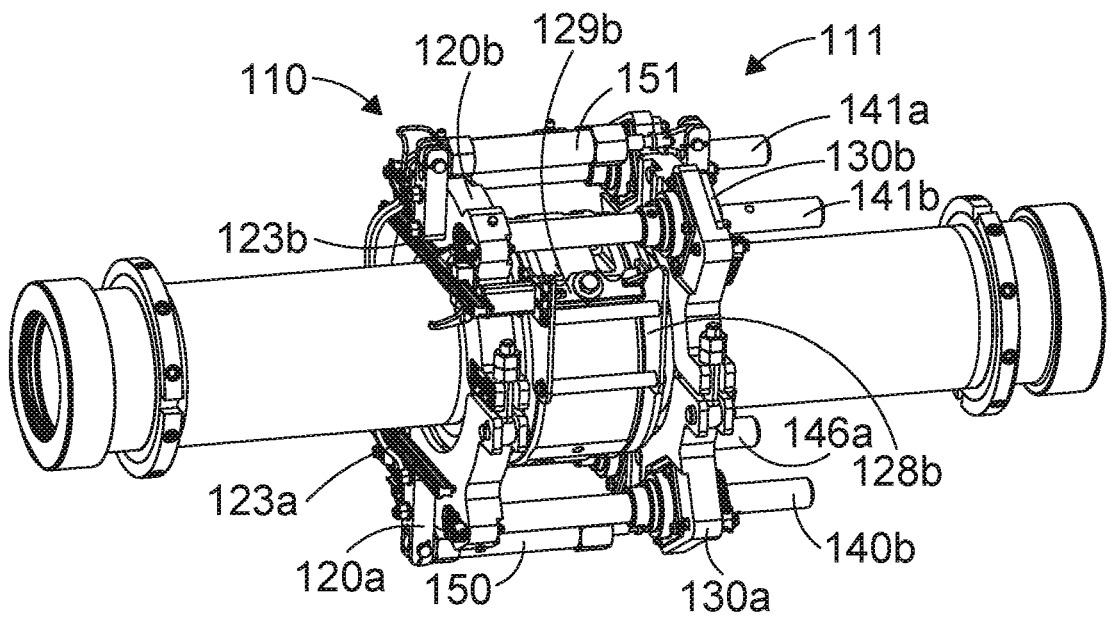
Figure 7D:
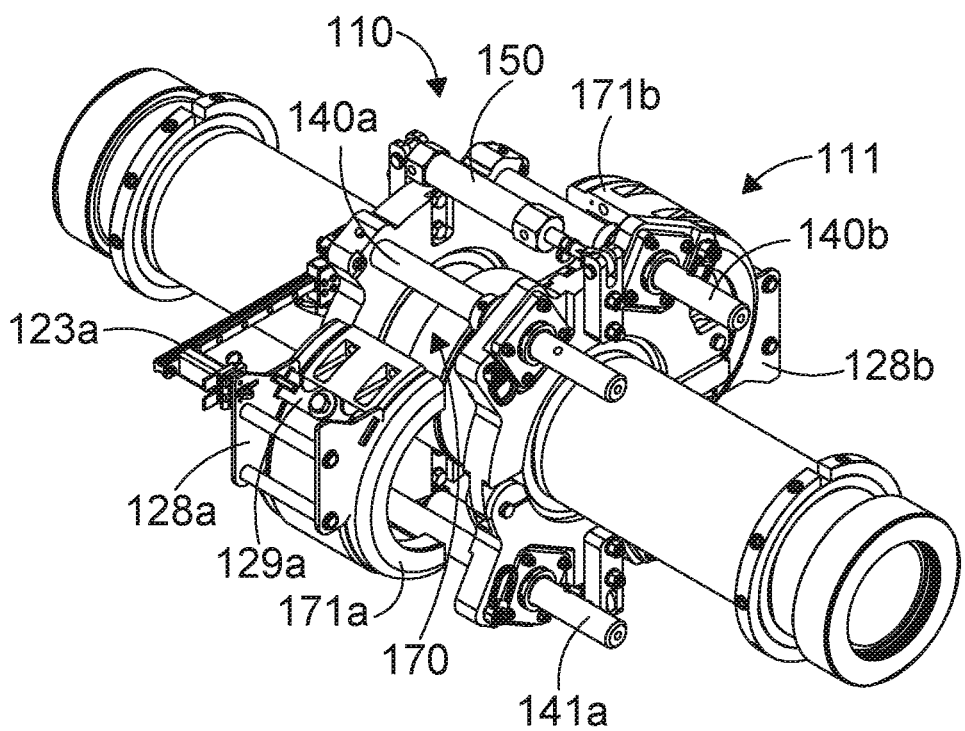

As first seen in FIG. 7d, the clamp brackets 128a, 128b are adapted to be attached to clamp segments 171a, 171b of the locking clamp which secures flowline connection 170. The locking clamp and clamp segments 171a, 171b in this example are equivalent to the locking clamp 71 and clamp segments 71a, 71b described above in the first example. In this example the clamp brackets 128a, 128b comprise two parallel plates which are joined by one or more handles, and a connection plate 129a, 129b (129b seen in FIG. 7e). Also in this example, an aperture is disposed through each of the connection plates 129a, 129b, through which a fixing such as a bolt can be passed to secure the clamp segments 171a, 171b to the clamp brackets 128a, 128b.

Figure 7E:
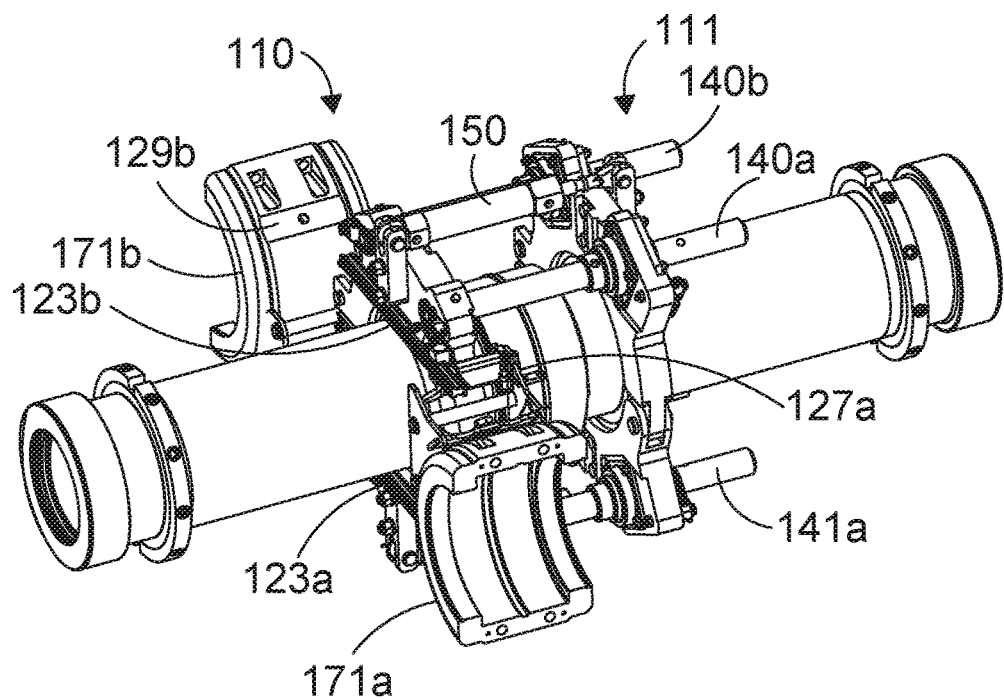

In this example the rail guides 121a, 121b are adapted to allow the rails 123a, 123b to slide bidirectionally through the rail guides. The rails 123a, 123b optionally slide in a direction perpendicular to the axes of the guide rods 140a, 140b, 141a, 141b, and optionally generally parallel to an axis which passes through the respective ends of the clamp segments 120a, 120b. In other words, rail 123a slides parallel to an axis joining the end portions 124a, 124b of clamp segment 120a, and rail 123b slides parallel to an axis joining the end portion 125 and opposing end of clamp segment 120b. Optionally the rails 123a and 123b are mutually parallel when the clamp segments are closed. Each clamp removal gantry 126a, 126b optionally has a stowed position, in which the clamp brackets 128a, 128b have least separation from the rail guides 121a, 121b and each rail 123a, 123b is positioned generally alongside the side surfaces of clamp segments 120a, 120b, as best seen in FIG. 7b. Each clamp removal gantry 126a, 126b optionally also has an extended position, in which the clamp brackets 128a, 128b have greatest separation from the rail guides 121a, 121b and each rail 123a, 123b is moved radially away from the generally circular aperture formed by the inner surfaces of the clamp members 120a, 120b, as best seen in FIGS. 7d and 7e. Also in this example, the opposing second end of each rail 123a, 123b from the clamp bracket 128a, 128b optionally incorporates a stop which prevents each rail 123a, 123 from sliding beyond the extended position seen in FIGS. 7d and 7e and out of the rail guides 121a, 121b. Optionally, each rail guide 121a, 121b also comprises a rail brake, which can be engaged e.g. by tightening to restrict the sliding movement of each rail 123a, 123b relative to the corresponding rail guide 121a, 121b.

In this example the clamp brackets 128a, 128b are connected to the first distal ends of the rails 123a, 123b by pivot connections or hinges 127a, 127b which allow the clamp brackets to rotate about approximately 180 degrees around the ends of the rails, best seen by comparing FIGS. 7d and 7e (although other ranges of motion are possible). The clamp brackets 128a, 128b rotate in a plane that is parallel with the rails 123a, 123b, and perpendicular to the plane of the circular aperture of the first clamp member 110, typically around a pivot axis that is perpendicular to the axes of the guide rods 140a,b and 141a,b. Optionally each clamp bracket hinge 127a, 127b incorporates a locking pin which can be inserted into each hinge to lock the position e.g. rotational position of each clamp bracket 128a, 128b relative to the rails 123a, 123b.

The operation of the clamp assembly 101 is generally similar to the operation of the first example of the clamp assembly 1 described above, except that in this example, the clamp removal gantries 126a, 126 assist in the removal of the clamp segments 171a, 171b of the locking clamp before the flowline connection 170 is separated, and when replacing the clamp segments 171a, 171b of the locking clamp after the flowline connection is remade.

While the clamp assembly 101 is supported (e.g. suspended) from a hoisting or lifting device, the clamp members 110, 111 are opened, for example by manually pulling end portions 124b, 134b of first clamp segments 120a, 130a away from end portions 125, 135 of second clamp segments 120b, 130b, as seen in FIG. 7a. The clamp assembly 101 is then lowered onto the flowline connection 170, the clamp members 110, 111 are closed around the flowline connection 170, and the swing bolts 114a, 114 are fully tightened after rotating the clamp assembly 101 a quarter turn around the flowline connection 170 into the position shown in FIG. 7b. The rail brakes in the rail guides 121a, 121b are disengaged and the locking pins removed from the clamp bracket hinges 127a, 127b (clamp hinge 127b only visible in FIG. 7a) to allow the clamp brackets 128a, 128b to be rotated around the pivot connections with the rails 123a, 123b, such that the connection plates 129a, 129b are now facing the flowline connection 170. The locking pins are then replaced in the clamp bracket hinges 127a, 127b to lock the clamp brackets 128a, 128b in position.

The clamp brackets 128a, 128b are then moved toward the clamp segments 171a, 171b by sliding the rails 123a, 123b toward their engaged position, seen in FIG. 7c. The positions of the clamp brackets 128a, 128b are adjusted until the connection plates of the clamp brackets 128a, 128b contact the clamp segments 171a, 171b, and bolts are inserted through the connection plates into the clamp segments to secure the clamp segments to the clamp brackets 128a, 128b. The rail brakes in the rail guides 121a, 121b are then re-engaged to ensure that any movement of the clamp brackets 128a, 128b relative to the flowline connection 170 is substantially restricted.

The fixings (typically bolts) between the clamp segments 171a, 171b can then be removed, releasing the clamp segments from each other and from the flowline, although the clamp segments typically remain substantially stationary while the rail brakes in the rail guides 121a, 121b are engaged. When the rail brakes are disengaged, the rails 123a, 123b and clamp brackets 128a, 128b can be moved partially or fully toward their extended position, shown in FIG. 7d, before the rail brakes are again engaged. The clamp segments 171a, 171b are thus removed from the flowline connection 170. In order to provide improved access to the flowline connection between the guide rods on either side of the flowline connection, the clamp brackets 128a, 128b and attached clamp segments 171a, 171b can then optionally be rotated by removing the locking pins from the clamp bracket hinges 127a, 127b, rotating the clamp brackets, and replacing the locking pins. The rails 123a, 123b and clamp brackets 128a, 128b with attached clamp segments 171a, 171b can also optionally be returned to their stowed positions as shown in FIG. 7e if a large unobstructed working area is required around the flowline connection 170 by releasing the rail brakes in the rail guides 121a, 121b, returning the rails 123a, 123b to their stowed positions and then optionally re-engaging the rail brakes.

Figure 7F:
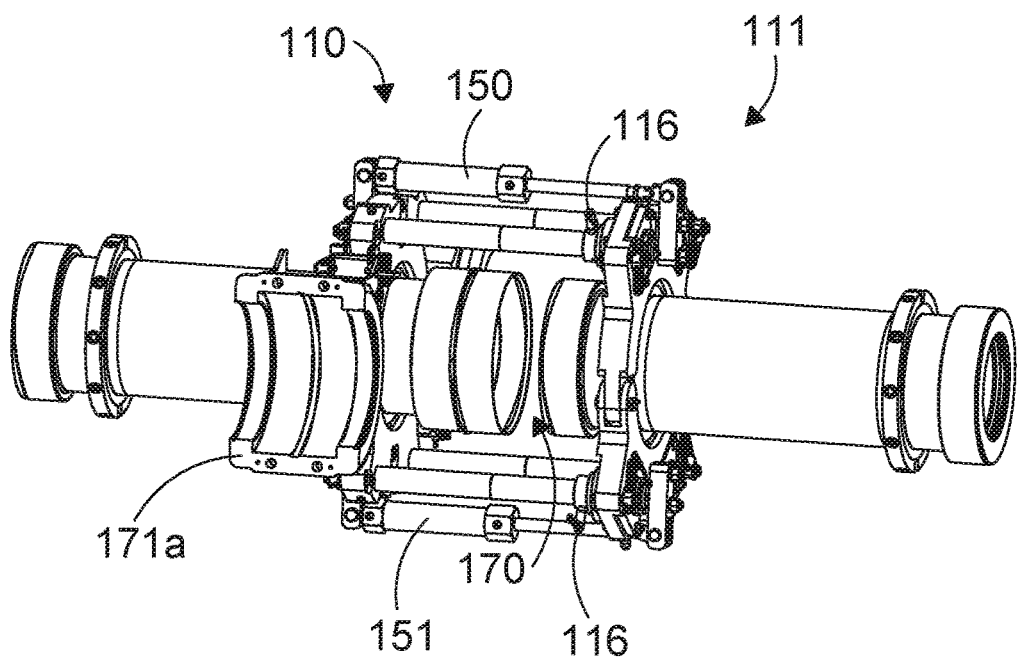

The flowline connection 170 can then be separated by actuating the hydraulic cylinders 150, 151, expanding the clamp assembly 101 and inserting the locking pins 116 in the same manner as previously described for the first example of a clamp assembly 1, as shown in FIG. 7f.

Figure 7G:
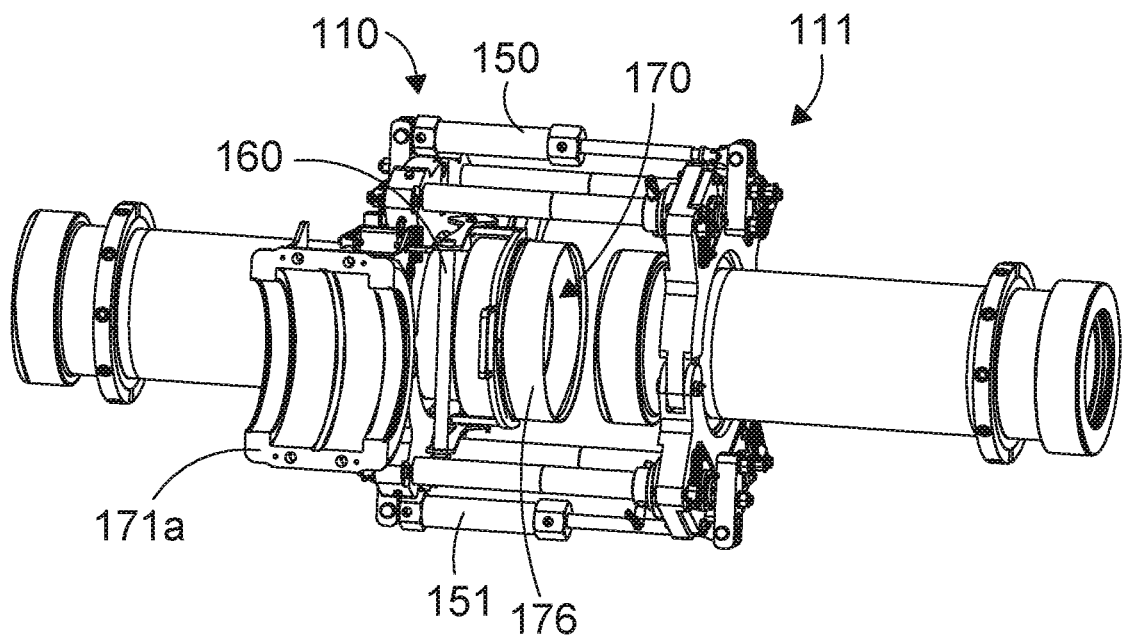
Figure 7H:
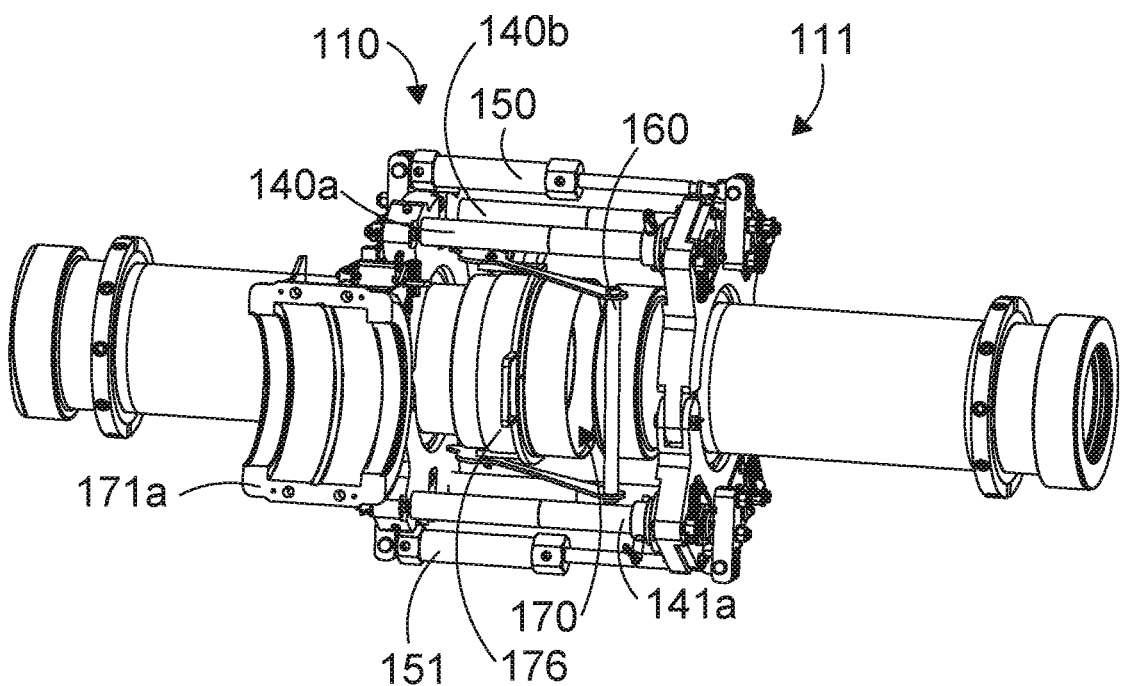

Use of a bearing removal tool 160 to remove the bearing ring 176 in the same manner described above in the first example is illustrated in FIGS. 7g and 7h. The bearing removal tool is shown inserted into the flowline connection 170 as shown in FIG. 7g to engage with the bearing ring 176, and then a force is applied e.g. in a direction generally parallel to the axes of the guide rods 140a,b and 141a,b to move the bearing removal tool 160 into the position shown in FIG. 7h, which as described previously, frees the bearing ring 176 from the flowline connection. The bearing ring 176 and or seals (shown only in FIG. 4 as 78a, 78b) can then be maintained or replaced as required.

Figure 7I:
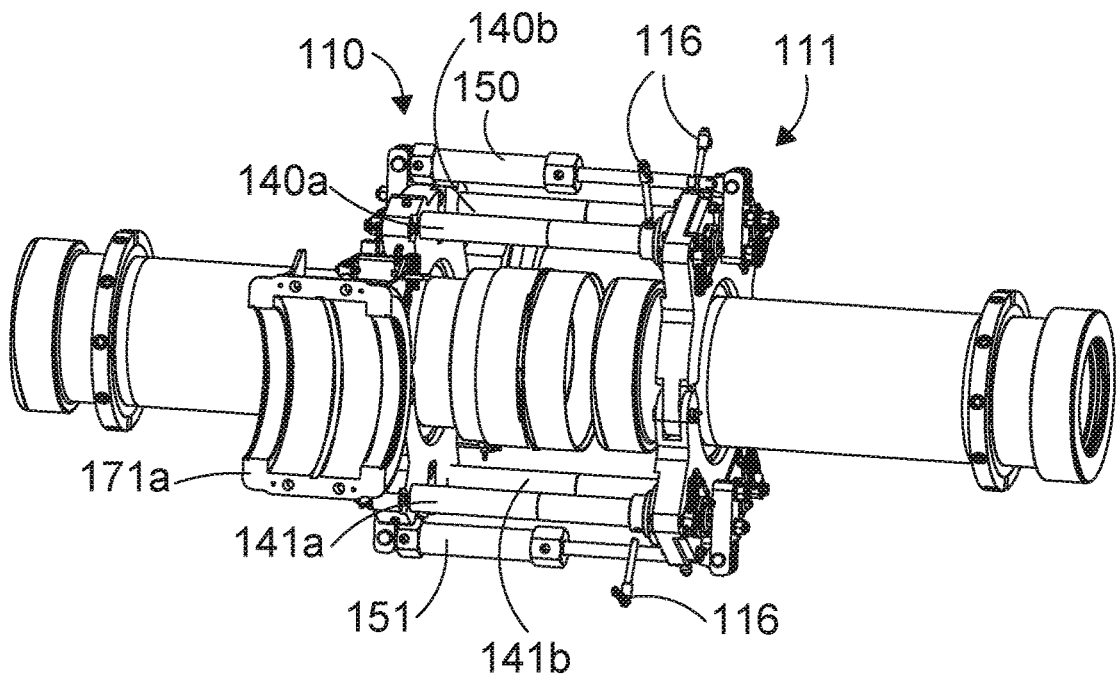
Figure 7J:
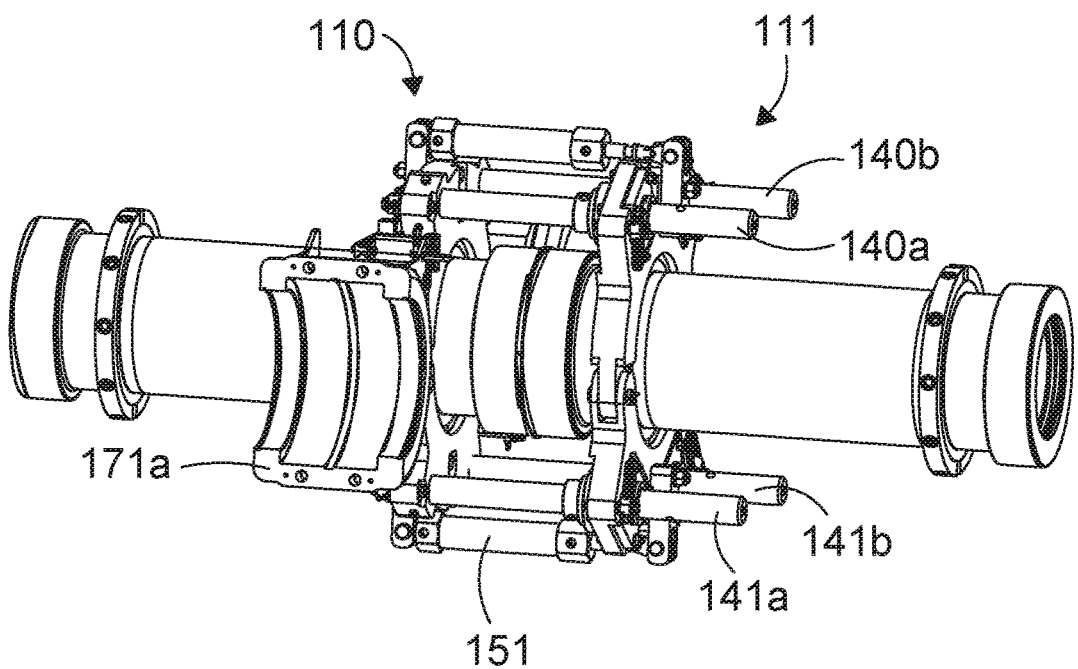

The procedure for re-making the flowline connection 170 and returning the clamp segments 171a, 171b to the flowline connection after the connection has been re-made is generally the reverse of the procedure for removing the clamp segments and breaking the flowline connection described above. As shown in FIG. 7i, after maintenance operations on the bearing and seal etc. in the flowline are complete, the locking pins 116 are removed from the guide rods 140a, 140b, 141a, 141b, and the hydraulic cylinders 150, 151 then activated to drive the clamp members 110, 111 toward each other, as shown in FIG. 7j.

Figure 7K:
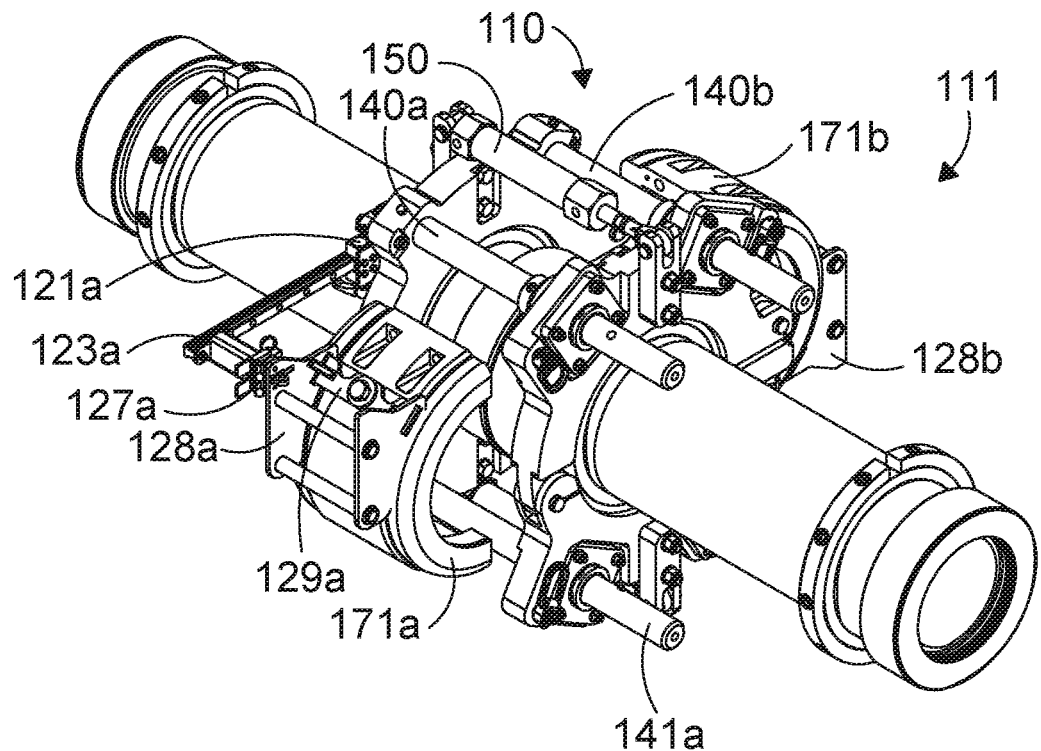

The rail brakes in the rail guides 121a, 121b and the locking pins of the clamp bracket hinges 127a, 127b are then released and or removed as required in order to manoeuvre the clamp brackets 128a, 128b and attached clamp segments 171a, 171b back into the engaged position around the flowline connection 170, as illustrated in FIG. 7k. As with removing the clamp segments 171a, 171b, the rail brakes are engaged when initially re-joining the clamp segments to each other, but it is useful if the rail brakes in the rail guides 121a, 121b are released prior to fully tightening the fixings e.g. bolts between the clamp segments 171a, 171b, to ensure that the clamp segments are free to move relative to each other while being fully tightened. Once the locking clamp 170 is again secured around the flowline connection, the connection plates of the clamp brackets 128a, 128b are released from the clamp segments 171a, 171b, and the clamp removal gantries 126a, 126b are again returned to their stowed positions as seen in FIG. 7b.

Figure 7L:
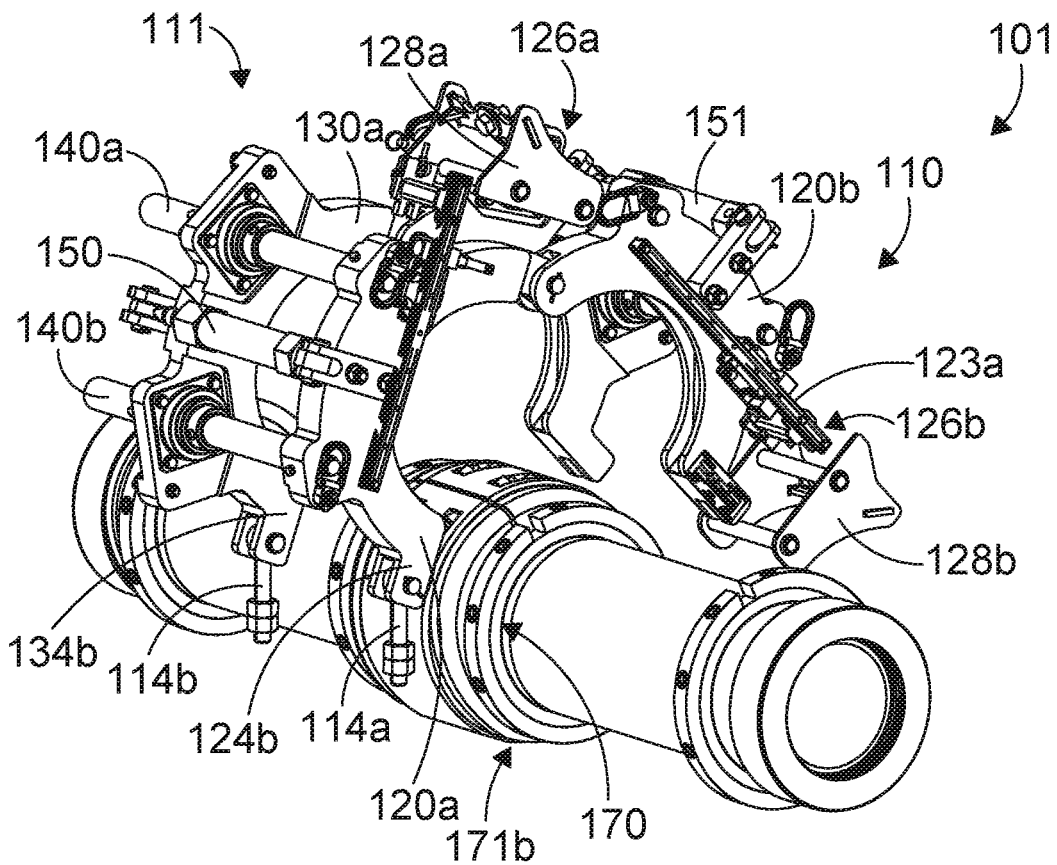

Finally, the swing bolts 114a, 114b can be partially loosened to allow the clamp assembly 101 to be rotated around the flowline connection 170, and then the swing bolts fully loosened and moved toward their unlocked positions, thus releasing the end portions 125, 135 of second clamp segments 120b, 130b from the end portions 124b, 134b of first clamp segments 120a, 130a. The clamp assembly 101 can then be re-attached to the hoisting or lifting device, and the clamp assembly 101 lifted above and away from the flowline connection 170, as shown in FIG. 7l. In one possible modification, the recesses of the assembly 101 shown in FIGS. 7a-7l could have multiple slots, e.g. 2, 3, 4 or more slots, arranged to receive multiple ridges of each of the load shoulders attached to the pipe. A similar modification could be made to the assembly 1 shown in the earlier figures.

What is claimed is:

1. A clamp assembly adapted for breaking a severable connection in a pressurized flowline of an oil or gas well, the clamp assembly comprising:

first and second clamp members, each of the first and second clamp members having at least first and second interconnected clamp segments, the first clamp segment being pivotally moveable with respect to the second clamp segment to close the clamp segments around a conduit;

at least one first guide rod with a first axis passing through the first clamp segment of the first clamp member and the first clamp segment of the second clamp member, the first guide rod directly connecting the first clamp segment of the first clamp member to the first clamp segment of the second clamp member, and at least one second guide rod with a second axis passing through the second clamp segment of the first clamp member and the second clamp segment of the second clamp member, the second guide rod directly connecting the second clamp segment of the first clamp member to the second clamp segment of the second clamp member, wherein the first and second axes of the first and second guide rods are parallel;

a drive mechanism having a third axis parallel to and separate from the first and second axes, and connecting the first clamp member to the second clamp member, wherein the drive mechanism is adapted to drive axial movement of the first and second clamp members relative to each other in a direction parallel to the first and second axes;

wherein the first clamp member is adapted to engage with a first conduit and the second clamp member is adapted to engage with a second conduit when the clamp segments are closed around the first and second conduits wherein the first and second conduits are on opposite sides of the severable connection;

wherein the first and second guide rods are adapted to permit relative axial movement of the first and second clamp members in a direction parallel to the first and second axes while maintaining alignment of the first and second clamp members, the first guide rod engaging at least one of the first or second clamp members in an axial sliding engagement and the second guide rod engaging at least one of the first or second clamp members in an axial sliding engagement;

wherein the first and second clamp segments on each of the first and second clamp members have an inner surface comprising a recess, and wherein each recess is adapted to receive at least a portion of a load shoulder, wherein each load shoulder comprises a protrusion extending radially outward from the first and second conduits, and wherein the recesses on the first clamp member are adapted to receive the protrusions on the first conduit, and the recesses on the second clamp member are adapted to receive the protrusions on the second conduit; and wherein, the axial movement driven by the drive mechanism causes axial engagement of an inner surface of each recess with a side of a respective protrusion to move the first conduit away from the second conduit and break the severable connection.

2. A clamp assembly as claimed in claim 1, wherein the first clamp segments of the first and second clamp members are constrained to pivot synchronously relative to the second clamp segments of the first and second clamp members.

3. A clamp assembly as claimed in claim 1, wherein each of the first and second clamp members comprises first and second plates arranged mutually parallel and perpendicular to the first axis, and wherein the first and second plates are spaced apart in a direction along the first axis, leaving a space between the first and second plates, and wherein the recess of each clamp member is disposed in the space between the first and second plates.

4. A clamp assembly as claimed in claim 1, wherein each recess has a radially inner edge which is at least partially annular and concave.

5. A clamp assembly as claimed in claim 1, wherein axially spaced sides of each recess are perpendicular to the first axis.

6. A clamp assembly as claimed in claim 1, wherein the protrusions on the first and second conduit are at least partially annular.

7. A clamp assembly as claimed in claim 1, wherein the first guide rod is fixed to the first clamp segment of the first clamp member at one end of the first guide rod, and wherein at the other end of the first guide rod, the connection between the first guide rod and the first clamp segment of the second clamp member permits relative axial sliding movement between the first guide rod and the first clamp segment of the second clamp member.

8. A clamp assembly as claimed in claim 7, wherein the second clamp member comprises at least one bearing device adapted to permit axial sliding movement of the second clamp member relative to the guide rod.

9. A clamp assembly as claimed in claim 8, wherein the bearing device permits axial movement of the second clamp member relative to the guide rod, and resists non-axial movement of the second clamp member relative to the guide rod.

10. A clamp assembly as claimed in claim 1, wherein at least one of the first and second guide rods comprises an indicator adapted to indicate axial separation between the first and second clamp members.

11. A clamp assembly as claimed in claim 1, wherein at least one of the first and second guide rods comprises a locking device adapted to resist axial movement of the second clamp member relative to the guide rod.

12. A clamp assembly as claimed in claim 1, wherein the drive mechanism comprises a first drive mechanism and a second drive mechanism, the first drive mechanism connecting the first clamp segment of the first clamp member to the first clamp segment of the second clamp member, and the second drive mechanism connecting the second clamp segment of the first clamp member to the second clamp segment of the second clamp member, wherein the first and second drive mechanisms are adapted to drive axial movement of the first and second clamp members relative to each other.

13. A clamp assembly as claimed in claim 12, wherein the first and second drive mechanisms are synchronized.

14. A clamp assembly as claimed in claim 12, wherein the first and second drive mechanisms share at least one common drive actuation system producing balanced driving forces in each of the first and second drive mechanisms.

15. A clamp assembly as claimed in claim 14, wherein the at least one common drive actuation system comprises a first common drive actuation system and a second common drive actuation system, wherein the first common drive actuation system permits synchronized actuation of the first and second drive mechanisms in a first direction, and wherein the second common drive actuation system permits synchronized actuation of the first and second drive mechanisms in a second opposing direction.

16. A clamp assembly as claimed in claim 1, including at least one clamp portion removal mechanism adapted to support a clamp portion during removal of the clamp portion from the connection, the clamp portion removal mechanism comprising a bracket adapted to connect to the clamp portion on the connection and a rail pivotally connected to the bracket, wherein the bracket is slidable in a direction perpendicular to the axes of the first and second guide rods.

17. A clamp assembly as claimed in claim 16, wherein the bracket is mounted on a pivot axis and is adapted to pivot relative to the rail in a plane that is parallel to the axes of the first and second guide rods.

18. A method of breaking a severable connection between first and second conduits in a pressurized flowline of an oil or gas well, the method using a clamp assembly, the clamp assembly comprising:

first and second clamp members, each of the first and second clamp members having at least first and second interconnected clamp segments, the first clamp segment being pivotally moveable with respect to the second clamp segment;

at least one first guide rod with a first axis connecting the first clamp segment of the first clamp member to the first clamp segment of the second clamp member, and at least one second guide rod with a second axis connecting the second clamp segment of the first clamp member to the second clamp segment of the second clamp member, wherein the first and second axes of the first and second guide rods are parallel; and a drive mechanism connecting the first clamp member to the second clamp member, wherein the method comprises:

engaging the first and second clamp members with the flowline on opposite sides of the severable connection by closing the clamp segments of the first clamp member around the first conduit and receiving load shoulders in the form of radial protrusions on an outer surface of the first conduit in recesses on the first and second clamp segments of the first clamp member and closing the clamp segments of the second clamp member around the second conduit and receiving load shoulders in the form of radial protrusions on an outer surface of the second conduit in recesses on the first and second clamp segments of the second clamp member; and driving axial movement of the first and second clamp members away from each other to break the severable connection between the first and second conduits, wherein the guide rods permit relative axial movement of the first and second clamp members in a direction parallel to the first and second axes while maintaining alignment of the first and second clamp members, wherein the method includes rotating the clamp assembly around the severable connection between the first and second conduits after the first and second clamp members have been closed around the severable connection, but before driving axial movement of the first and second clamp members to break the severable connection.

19. A method as claimed in claim 18, wherein the method includes driving axial movement of the first and second clamp members toward each other to re-make the severable connection between the first and second conduits while the first and second clamp members are closed around the severable connection.

* * * * *